US010548340B2

(12) United States Patent
Nelissen et al.

(10) Patent No.: US 10,548,340 B2
(45) Date of Patent: **\*Feb. 4, 2020**

(54) APPARATUS AND METHOD FOR COOKING AN EGG

(71) Applicant: EGGCITING PRODUCTS B.V., Oirlo (NL)

(72) Inventors: Joseph Wilhelmus Petrus Maria Nelissen, Oirlo (NL); Edwin Matheus Jozef Hanssen, Lanaken (BE); Sander-Willem Van Schaik, Utrecht (NL)

(73) Assignee: EGGCITING PRODUCTS B.V., Oirlo (NL)

( \* ) Notice: Subject to any disclaimer, the term of this patent is extended or adjusted under 35 U.S.C. 154(b) by 272 days.

This patent is subject to a terminal disclaimer.

(21) Appl. No.: 15/306,079

(22) PCT Filed: Apr. 14, 2015

(86) PCT No.: PCT/EP2015/058056
§ 371 (c)(1),
(2) Date: Oct. 21, 2016

(87) PCT Pub. No.: WO2015/162033
PCT Pub. Date: Oct. 29, 2015

(65) Prior Publication Data
US 2017/0042203 A1 Feb. 16, 2017

(30) Foreign Application Priority Data

Apr. 24, 2014 (NL) ..................................... 2012689

(51) Int. Cl.
*A23L 5/10* (2016.01)
*H05B 6/80* (2006.01)
(Continued)

(52) U.S. Cl.
CPC .............. *A23L 5/10* (2016.08); *A23B 5/0052* (2013.01); *A23B 5/01* (2013.01); *A23L 5/13* (2016.08);
(Continued)

(58) Field of Classification Search
CPC ..... A23L 3/01; A23L 5/13; A23L 5/15; A23L 15/00; A23B 5/00–0052; A23B 5/01;
(Continued)

(56) References Cited

U.S. PATENT DOCUMENTS 1,340,566 A \* 5/1920 Seidl .................... A47J 29/00
99/344
2,057,741 A \* 10/1936 Purpura ................ A47J 29/00
219/401
(Continued)

FOREIGN PATENT DOCUMENTS

DE 19738380 A1 \* 3/1999 .............. A47J 29/00
EP 0988795 A1 3/2000
(Continued)

OTHER PUBLICATIONS

International Search Report for PCT/EP2015/058056 dated Jul. 2, 2015.
(Continued)

*Primary Examiner* — Drew E Becker
(74) *Attorney, Agent, or Firm* — Ladas & Parry, LLP

(57) ABSTRACT

An apparatus and method for cooking at least one egg with an eggshell. The apparatus comprises a housing provided with a device for providing microwave radiation in a confined space in the housing and a holder located in the confined space. The holder is provided with at least one cavity adapted to the shape of the egg with the eggshell. The holder comprises at least a first holder part and a second holder part being movable with respect to each other (Continued)

between a first position in which an egg with an eggshell can be positioned in the cavity to a second position wherein the holder parts enclose the cavity. The apparatus further comprises means to insert a liquid into the holder for filling the cavity with the liquid to at least partly surround the eggshell of the egg located in the cavity. The housing comprises at least a first housing part provided with the first holder part and a second housing part provided with the second holder part. The first housing part is located at least partly below the second housing part. The first housing part with the first holder part is movable between the first and second position with respect to the second housing part with the second holder part.

14 Claims, 23 Drawing Sheets

(51) Int. Cl.
| | |
|---|---|
| A23B 5/005 | (2006.01) |
| A23L 15/00 | (2016.01) |
| A47J 29/06 | (2006.01) |
| A23B 5/01 | (2006.01) |
| A47J 29/02 | (2006.01) |
| H05B 6/64 | (2006.01) |

(52) U.S. Cl.
CPC .............. *A23L 5/15* (2016.08); *A23L 15/00* (2016.08); *A47J 29/02* (2013.01); *A47J 29/06* (2013.01); *H05B 6/6473* (2013.01); *H05B 6/80* (2013.01); *A23V 2002/00* (2013.01)

(58) Field of Classification Search
CPC ............ A47J 2027/043; A47J 29/00–06; A47J 27/10; A47J 27/18; H05B 6/80–804; A23V 2002/00
USPC ............... 426/231–233, 523, 241–243, 614, 426/298–301, 506–511; 99/330, 407, 99/451; 219/679, 687–688, 702, 733, 731
See application file for complete search history.

(56) References Cited

U.S. PATENT DOCUMENTS

| | | | | |
|---|---|---|---|---|
| 2,425,199 A | * | 8/1947 | Navon | A47J 29/02 219/407 |
| 2,518,566 A | * | 8/1950 | Osterheld | A47J 29/02 219/401 |
| 2,790,378 A | * | 4/1957 | Zander | A47J 29/04 74/3.5 |
| 2,944,540 A | * | 7/1960 | Littell, Jr. | F24C 15/027 126/19 M |
| 3,411,432 A | * | 11/1968 | Willett | A47J 27/04 99/340 |
| 3,910,174 A | * | 10/1975 | Nelles | A01J 25/167 426/582 |
| 4,817,513 A | * | 4/1989 | Carbon | A21B 5/026 99/372 |
| 5,783,237 A | * | 7/1998 | Sanderson | A23B 4/023 426/36 |
| 6,038,966 A | * | 3/2000 | Spence | A47J 29/00 99/336 |
| 6,073,624 A | * | 6/2000 | Laurent | A47B 46/005 126/273 A |
| 9,108,788 B2 | * | 8/2015 | Nelissen | A47J 29/02 |
| 2004/0231524 A1 | * | 11/2004 | Kuttalek | F24C 15/162 99/357 |
| 2008/0041237 A1 | * | 2/2008 | Bonsell | A47J 29/04 99/328 |
| 2008/0145491 A1 | | 6/2008 | Braeken | |
| 2008/0314258 A1 | * | 12/2008 | Martin | A47J 27/004 99/329 R |
| 2011/0088564 A1 | * | 4/2011 | Bonsell | A47J 29/04 99/336 |
| 2013/0196039 A1 | * | 8/2013 | Nelissen | A47J 29/02 426/233 |
| 2014/0013963 A1 | * | 1/2014 | Hoffmann | F24C 15/2007 99/403 |
| 2014/0246008 A1 | * | 9/2014 | Martin | F24C 15/027 126/273 A |
| 2017/0042360 A1 | * | 2/2017 | Van Schaik | A47J 29/02 |
| 2017/0119194 A1 | * | 5/2017 | Nelissen | A23L 15/00 |

FOREIGN PATENT DOCUMENTS

| | | |
|---|---|---|
| EP | 0992197 A1 | 4/2000 |
| JP | H07100067 A | 4/1995 |
| JP | 09065979 A * | 3/1997 |
| WO | 2008/007041 A1 | 1/2008 |
| WO | 2012/002814 A1 | 1/2012 |
| WO | WO-2012002814 A1 * | 1/2012 .............. A47J 29/02 |

OTHER PUBLICATIONS

Written Opinion of the International Search Authority PCT/EP2015/058056 dated Jul. 2, 2015.
PCT International Preliminary Report on Patentability Chapter I from PCT/EP2015/058056 dated Oct. 25, 2016.

* cited by examiner

APPARATUS AND METHOD FOR COOKING AN EGG

CROSS-REFERENCE TO RELATED APPLICATIONS

This application is the U.S. national phase of PCT Application PCT/EP2015/058056 filed on Apr. 14, 2015, which claims the priority of the Dutch patent application No. 2012689 filed on Apr. 24, 2014, which are incorporated herein by reference in their entireties.

FIELD OF THE INVENTION

The invention relates to an apparatus for cooking at least one egg with an eggshell, which apparatus comprises a housing provided with a device for providing microwave radiation in a confined space in the housing and a holder located in the confined space, which holder being provided with at least one cavity adapted to the shape of the egg with the eggshell, which holder comprises at least a first holder part and a second holder part being movable with respect to each other between a first position in which an egg with an eggshell can be positioned in the cavity to a second position wherein the holder parts enclose the cavity, which apparatus further comprises means to insert a liquid into the holder for filling the cavity with the liquid to at least partly surround the eggshell of the egg located in the cavity.

The invention also relates to a method for cooking at least one egg with an eggshell in such an apparatus.

BACKGROUND OF THE INVENTION

By such an apparatus, which is known from WO2012002814A1, the housing has hinges for a lid, enabling opening of a microwave cavity. The holder has two parts allowing access to cavities in the holder in order to place or remove eggs, for instance hinging the two parts of the holder apart provides access to the cavities. After eggs are placed in the holder, liquid is inserted into the holder to fill the cavities to surround the eggshell of the egg located in the cavity with the liquid. Then the device for providing microwave radiation is turned on whereby the liquid as well as the egg is being heated. The liquid is in heat exchanging contact with the eggshell, whereby due to the layer of liquid around the eggshell a good cooking process of the egg by means of the microwave radiation is obtained.

The egg can be cooked in less than two minutes. The apparatus of WO2012002814A1 is provided with an outlet being coupled to a drain for removal of the liquid from the holder after use.

A user of the apparatus needs to perform a relatively large number of acts for preparing the egg, amongst other opening the lid of the housing, opening the holder, placing the egg in the holder, closing the holder, closing the lid of the housing, choosing the setting for selecting soft, medium or hard boiled egg, opening the lid after the cooking process has finished, opening the holder to obtain access to the cavity and to be able to remove the egg, close the holder again and then close the lid again. The number of actions is relatively large compared to the relatively short cooking time of the egg. In case that the time needed to cook the egg is further reduced, such large number of actions will be relatively annoying.

SUMMARY OF THE INVENTION

It is an object of the apparatus according to the invention to reduce the number of actions needed for opening and closing the housing and the holder.

This object is achieved by the apparatus according to the invention in that the housing comprises at least a first housing part provided with the first holder part and a second housing part provided with the second holder part, which first housing part is located at least partly below the second housing part, wherein the first housing part with the first holder part is movable between the first and second position with respect to the second housing part with the second holder part.

By providing the first housing part with the first holder part and by providing the second housing part with the second holder part, the confined space and the cavity can simultaneously be opened by moving the first housing part with the first holder part away from the second housing part with the second holder part.

Since the first housing part is located at least partly below the second housing part, it will be relatively easy in the first position to place an egg in the first holder part.

By moving the first housing part with the first holder part from the first position to the second position, the confined space as well as the cavity will be closed after which the cavity can be filled with liquid and the device for providing microwave radiation in the confined space can be switched on for cooking the egg.

It has to be noted that US20080145491A1 discloses an apparatus for cooking at least one egg with an eggshell. However, this apparatus comprises a carrier plate with square openings with rounded corners that constitute holders for the vertical positioning of eggs. The carrier plate can be made from a wired structure in order to ensure adequate circulation of steam around the eggs. The square openings with rounded corners in the carrier plate do not form cavities which can be filled with a liquid to at least partly surround the eggshell of the egg located in the cavity so that a desired layer of liquid around the egg located in the cavity can be maintained. Furthermore, US20080145491A1 does not disclose a housing comprising at least a first housing part provided with a first holder part and a second housing part provided with a second holder part.

It also has to be noted that JP07100067A discloses a container for enclosing an egg, which container is set in a microwave oven. The container does not have an integrated source of microwave radiation and also does not disclose a housing comprising at least a first housing part provided with a first holder part and a second housing part provided with a second holder part.

An embodiment of the apparatus according to the invention is characterized in that the second holder part comprises an open outlet for at least a gaseous phase of the liquid formed in the cavity during the cooking process.

When heating the egg and the liquid surrounding the eggshell of the egg, the liquid will be turned into a gaseous phase which gas or steam can escape through the open outlet to prevent a pressure build up in the cavity. Since no large pressure build up occurs in the cavity, the forces on the first and second holder part are relatively low so that a relatively light apparatus can be built.

Another embodiment of the apparatus according to the invention is characterized in that the means to insert a liquid into the holder comprises at least a liquid inlet and a liquid outlet located in the first holder part.

Since the first holder part is located below the second holder part, the liquid will automatically flow into the first holder part and can flow out of the first holder part through the liquid outlet. By having also the liquid inlet located in the first holder part, the transport of liquid is located in the lower first holder part making the apparatus relatively simple.

Another embodiment of the apparatus according to the invention is characterized in that the means to insert a liquid into the holder comprises at least two pumps, wherein a first pump is connected by a first conduit to the liquid inlet, whilst a second pump is connected by a second conduit to the liquid outlet.

By having two pumps, one for pumping liquid into the cavity through the liquid inlet and one for pumping the liquid out of the cavity through the liquid outlet, no valves are needed between the pumps and the cavity since by switching the pumps on or off, transport of liquid through each pump is being controlled.

Another embodiment of the apparatus according to the invention is characterized in that in that the liquid inlet and the liquid outlet are formed by a common tube.

Since the liquid is either inserted into the cavity or removed from the cavity, a common tube can be used through which the liquid can either be inserted into the cavity or removed from the cavity. Due to such common tube the first holder part is relatively simple and can easily be cleaned.

Another embodiment of the apparatus according to the invention is characterized in that the first holder part is provided with spacers for keeping the egg at a predetermined distance from a wall of the first holder part, whilst the second holder part is provided with a spring for pressing the egg against the spacers of the first holder part.

Due to the spacers, the liquid can be located around nearly the complete egg, except for the contact areas of the egg with the spacers. To maintain the egg in a stable position within the cavity the second holder part is provided with a spring by means of which the egg is pressed against the spacers of the first holder part. By such spring eggs of different sizes can be positioned in the cavity and be kept in a stable position in the cavity.

Another embodiment of the apparatus according to the invention is characterized in that a seal is provided between the first holder part and the second holder part.

By the seal leakage of liquid between the first holder part and the second holder part is easily being prevented.

Another embodiment of the apparatus according to the invention is characterized in that the first and/or second holder parts are removably located in respectively the first housing part and the second housing part.

By having removable first and/or second holder part, the holder parts can be removed for easy hygienic cleaning such as in a dishwasher or for replacing them by first and/or second holder parts being suitable for eggs with other dimensions or with other spacers, for example.

Another embodiment of the apparatus according to the invention is characterized in that the second housing part is provided with the device for providing microwave radiation in the confined space in the housing.

By having the device for providing microwave radiation in the second housing, which housing part is located above the first housing part, it can be guaranteed that microwave radiation can be provided in the cavity. Furthermore, in case that the liquid inlet and liquid outlet are located in the first holder part a good separation of the liquid flow and the device for providing microwave radiation is guaranteed and the risk that the liquid reaches the device is limited.

Another embodiment of the apparatus according to the invention is characterized in that the first housing part is being movable away from the second housing part from the second position to the first position in at least a downward direction.

Although either the first housing part or the second housing part or both housing parts can be moved with respect to each other to obtain access to the cavity, it is found out that moving the first housing part comprising the first holder part with respect to the apparatus, especially if the device for providing microwave radiation is located in the second housing part, is preferred.

Another embodiment of the apparatus according to the invention is characterized in that the first housing part is being pivotable with respect to the second housing part from the second position to the first position in at least a downward direction.

Such a pivoting motion of the first housing part with respect to the second housing part is relatively easy whereby the pivoting movement is preferably directed towards the user so that the egg present in the first holding part can easily be taken out by the user. Next to the movement in the downward direction, it is preferred that the first housing part is also being moved in a direction towards the user so that the user can easily place the egg to be cooked in the cavity and can easily take out the cooked egg.

Another embodiment of the apparatus according to the invention is characterized in that the apparatus comprises a container for holding aqueous liquid and a dosing unit to add at least one component to the aqueous liquid to provide the aqueous liquid with a dielectric constant with an imaginary part, $\varepsilon''$, between 20-500 at a temperature between 0° C.-100° C. and at a microwave frequency of 2.45 GHz.

With such an aqueous liquid it is found out that a good cooking process of an egg is obtained whereby both the egg york as well as the egg white get the desired properties. The advantages of the aqueous liquid with the described dielectric constant are described in WO2012002814A1. This document is incorporated by reference in this application.

By means of the dosing unit at least one component, for example salt preferably NaCl can be added to the liquid, for example water, to obtain the desired aqueous liquid. The user can fill the container with tab water after which the required amount of component is added to the water by the dosing unit so that the container is filled with the desired aqueous liquid.

Other kinds of liquid and components are also possible.

Another embodiment of the apparatus according to the invention is characterized in that the aqueous liquid is water with NaCl, preferably 0.2M NaCl.

Water is easily available in every household or restaurant and also salt like NaCl can easily be obtained. Furthermore, a combination of water with such an amount of NaCl is not toxic for humans.

Another embodiment of the apparatus according to the invention is characterized in that the apparatus comprises a container for waste liquid, which container is connected to the cavity.

The liquid removed from the cavity after the cooking process as well as the liquid in gaseous phase, steam in case of water, can be collected in the container for waste liquid, which waste liquid can be disgarded.

Another embodiment of the apparatus according to the invention is characterized in that the apparatus comprises a lock to maintain the first holder part and the second holder part in the second position at least during providing microwave radiation in the confined space.

With such a lock it is guaranteed that the egg in the cavity is being subjected to microwave radiation long enough to perform the cooking of the egg. Only after the microwave radiation is turned off and preferably after the liquid is being removed from the cavity, the lock is being unlocked so that a user can remove the cooked egg from the first holder part.

Another embodiment of the apparatus according to the invention is characterized in that the cavity is chicken-egg-shaped, with a relatively small end of the chicken-egg-shape directed towards the first holder part and a relatively wider end of the chicken-egg-shape directed towards the second holder part.

Each egg has an ovoid shape with an axis of rotational symmetry or a kind of rotational symmetry. Near one end of said axis the end of the egg is smaller and sharper than near the other end where the end of the egg is wider and less sharp. It is found out that better cooking results are obtained when placing the egg in the cavity with the small end of the egg directed downwards. To encourage a user to place the egg in such a position in the holder, the small end of the chicken egg shape is formed in the first holder part.

Another embodiment of the apparatus according to the invention is characterized in that the liquid has an average layer thickness between the holder and the eggshell of the egg between 2 and 8 millimetres.

With such an average layer thickness the amount of liquid needed for cooking the egg is limited while the layer is thick enough to provide a good cooking process of the egg. As the egg is preferably supported in the lower first holder part by spacers and is preferably being pressed against said spacers by a spring, there will be some direct contact between the egg and the first and second holder part. However such contact is limited and nearly the whole eggshell is surrounded by the liquid at the beginning of the cooking process.

The invention also relates to a method for cooking at least one egg with an eggshell by means of an apparatus as described above. By moving the first housing part with the first holder part with respect to the second housing with the second holder part, only one movement need to be performed to open the confined space simultaneously with opening of the cavity and also only one movement need to be performed to close the confined space as well as the cavity.

An embodiment of the method according to the invention is characterized in that during providing microwave radiation, a second amount of liquid is gradually inserted into the cavity.

By adding gradually a second amount of liquid, the amount of liquid that has been evaporated and has been removed through the outlet is being replenished.

A BRIEF DESCRIPTION OF THE DRAWINGS

In the drawings like reference numerals refer to like elements.

DESCRIPTION OF PREFERRED EMBODIMENTS

FIG. 1a-7 show different views of a first embodiment of an apparatus 1 according to the invention and specific parts thereof. From the apparatus 1 only relevant components are shown and other components like covers and mounting constructions for mounting elements in the apparatus are left out for reason of clarity.

Figure 1A:
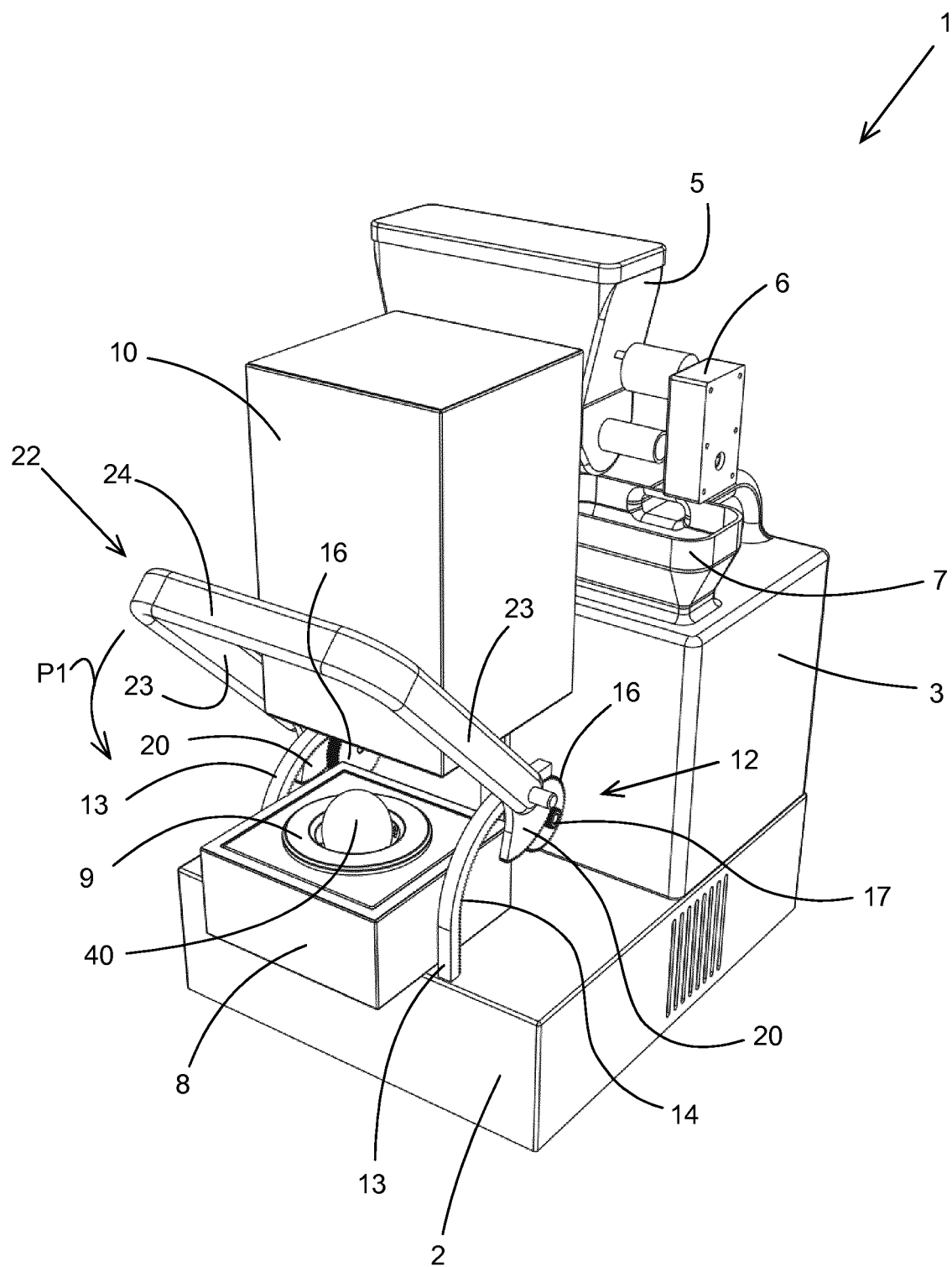
FIGS. 1a and 1b show a perspective front view and rear view of a first embodiment of an apparatus according to the invention in an open position of the housing parts.
Figure 1B:
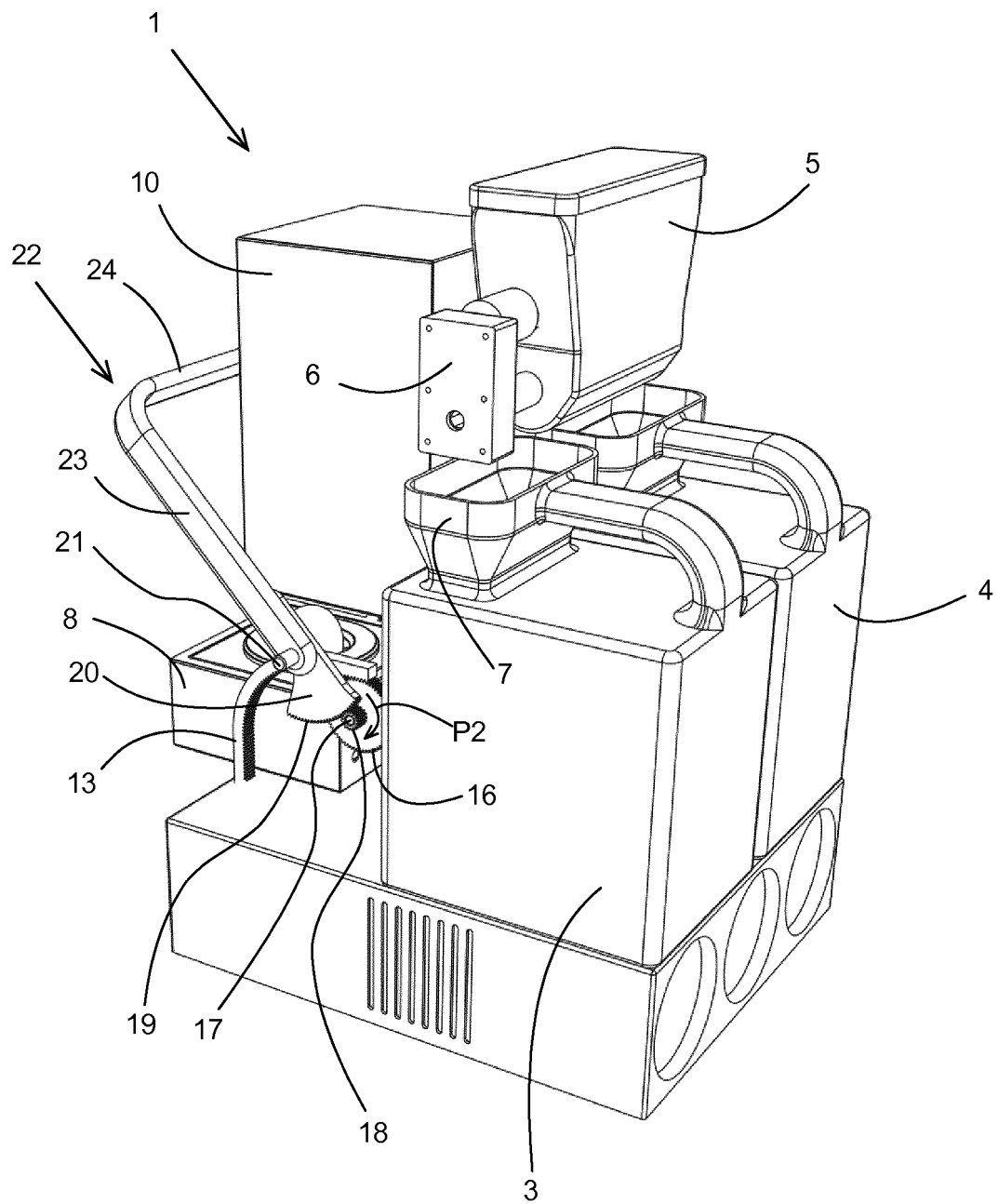
Figure 1C:
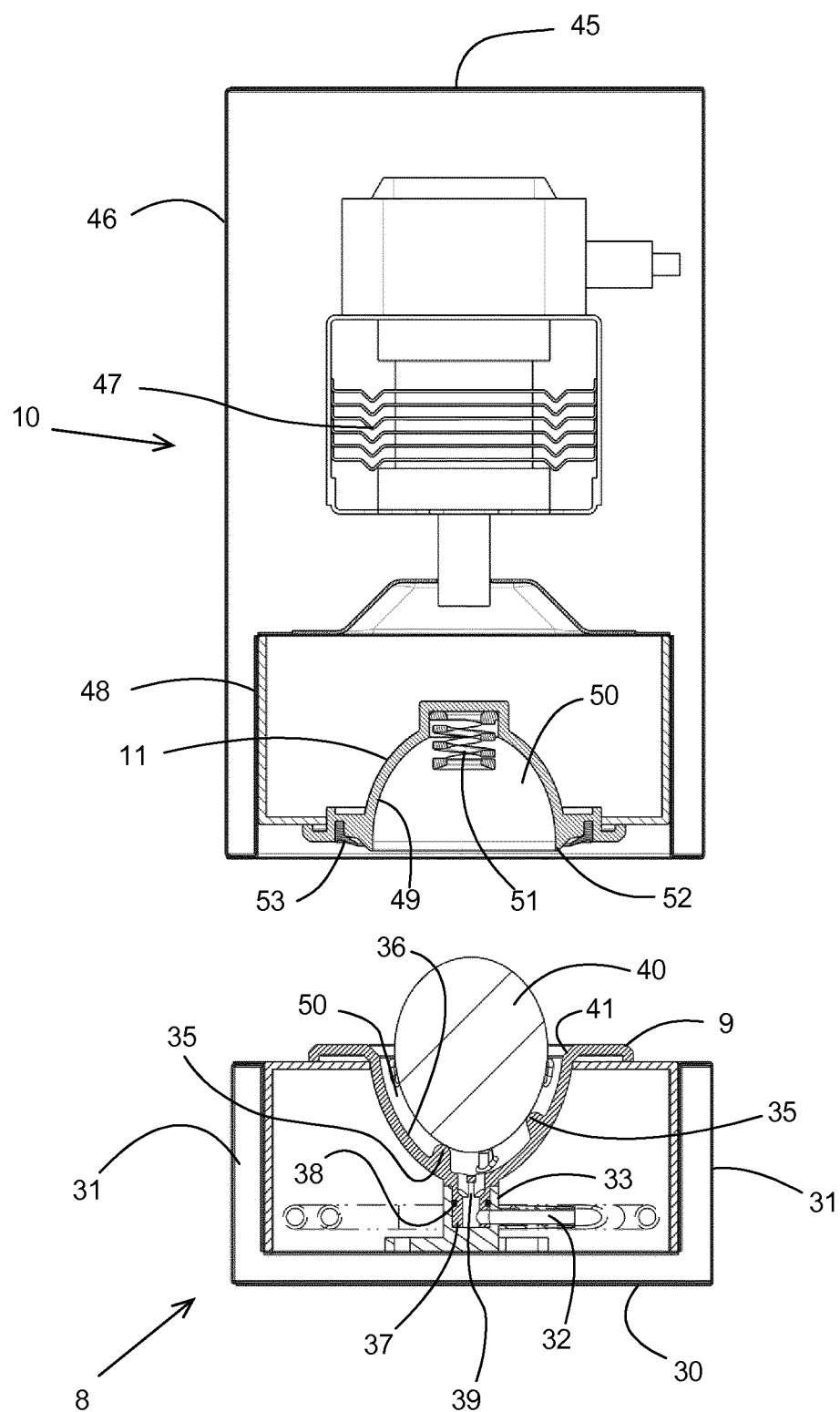
FIG. 1c shows a cross section of a part of the apparatus as shown in FIGS. 1a-1b.
Figure 2:
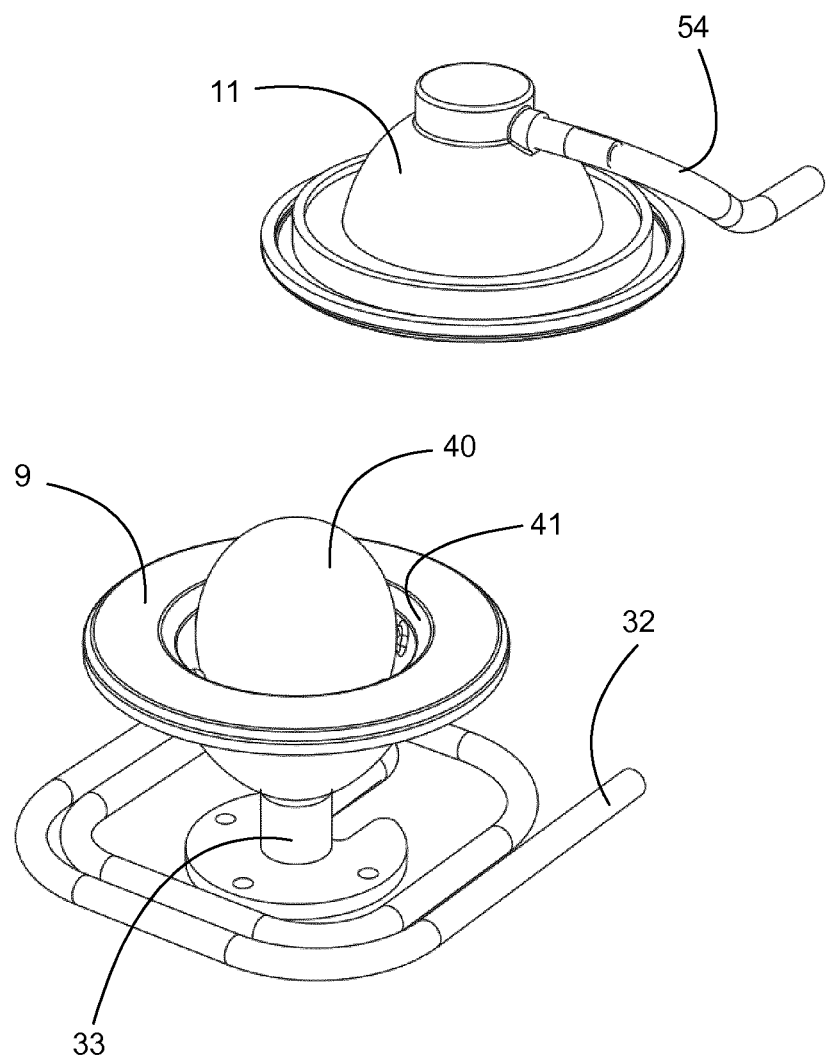
FIGS. 2-4 show perspective views of parts of the apparatus as shown in FIGS. 1a-1c.
Figure 3:
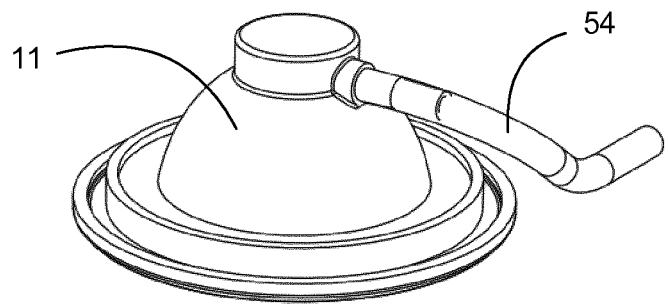
Figure 3:
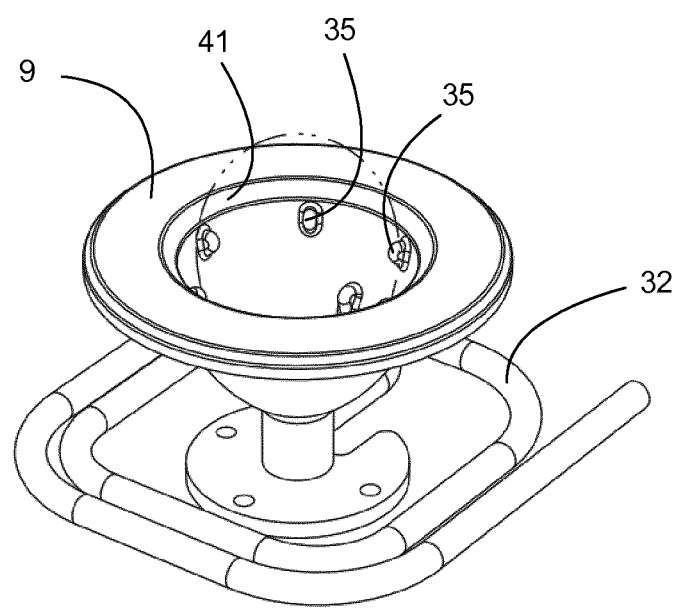
Figure 4:
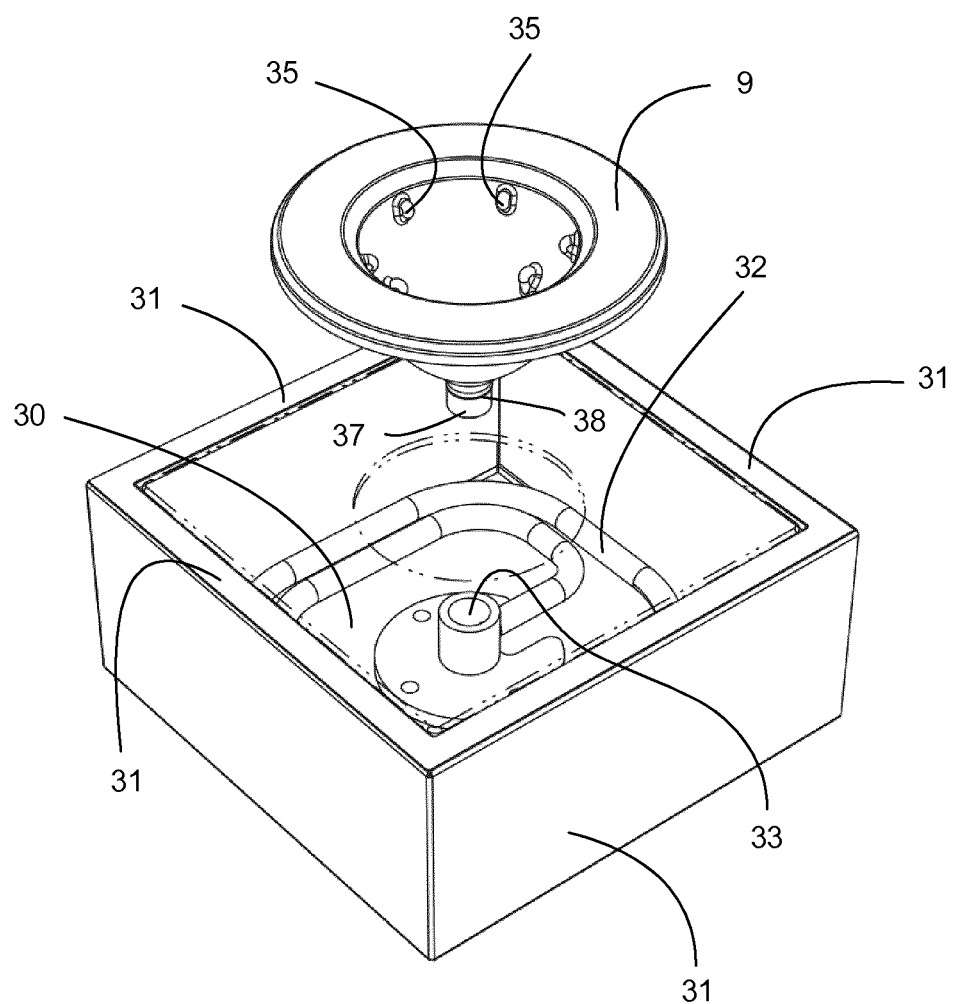
Figure 5:
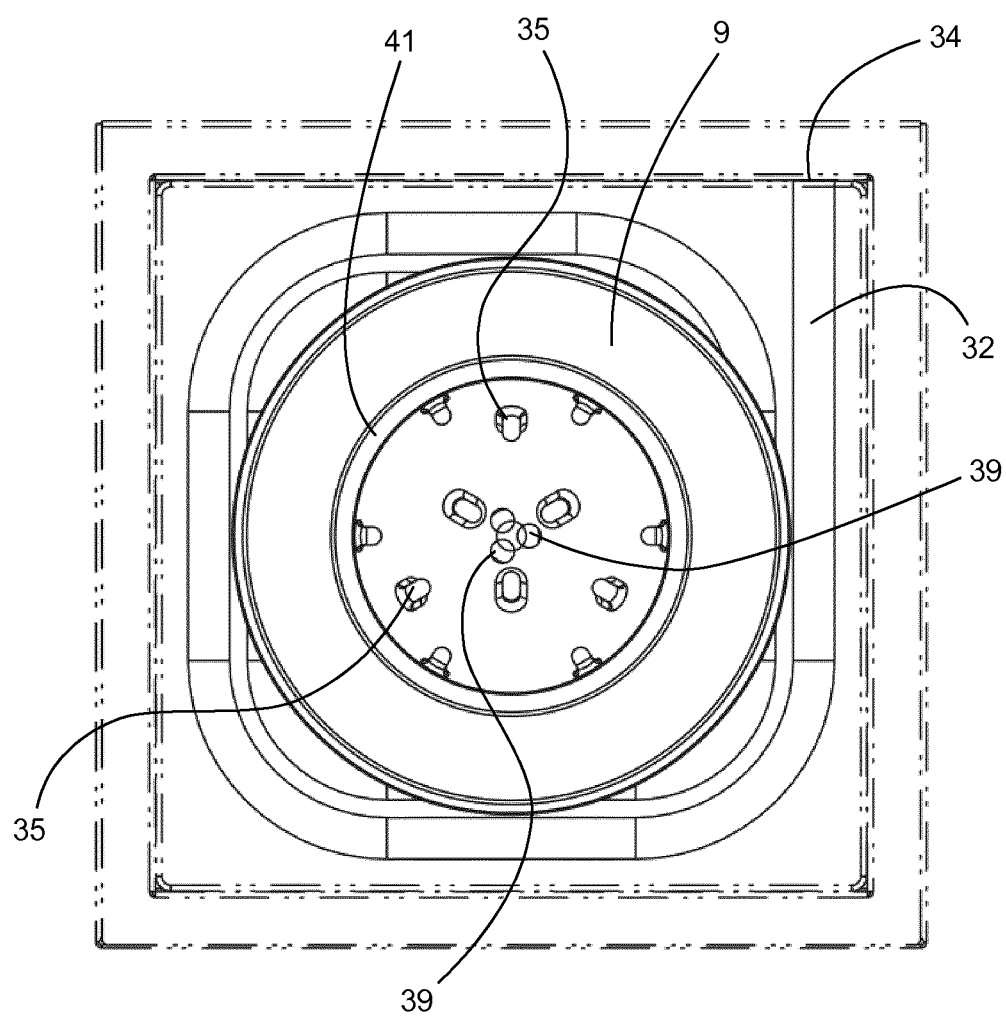
FIG. 5 shows a top view of the part as shown in FIG. 4.
Figure 6A:
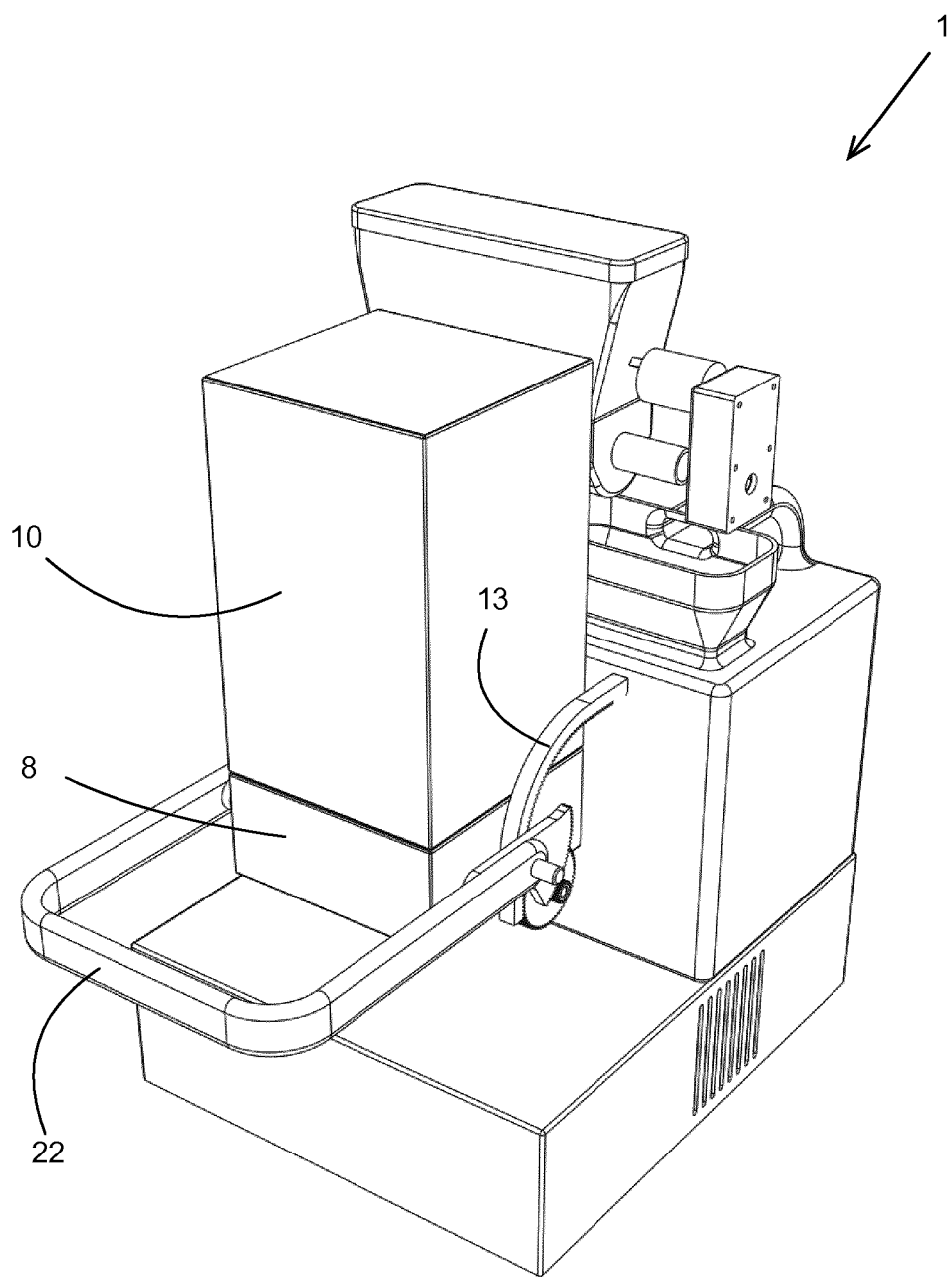
FIGS. 6a and 6b show a perspective front view and rear view of the apparatus as shown in FIG. 1a-1b in a closed position of the housing parts.
Figure 6B:
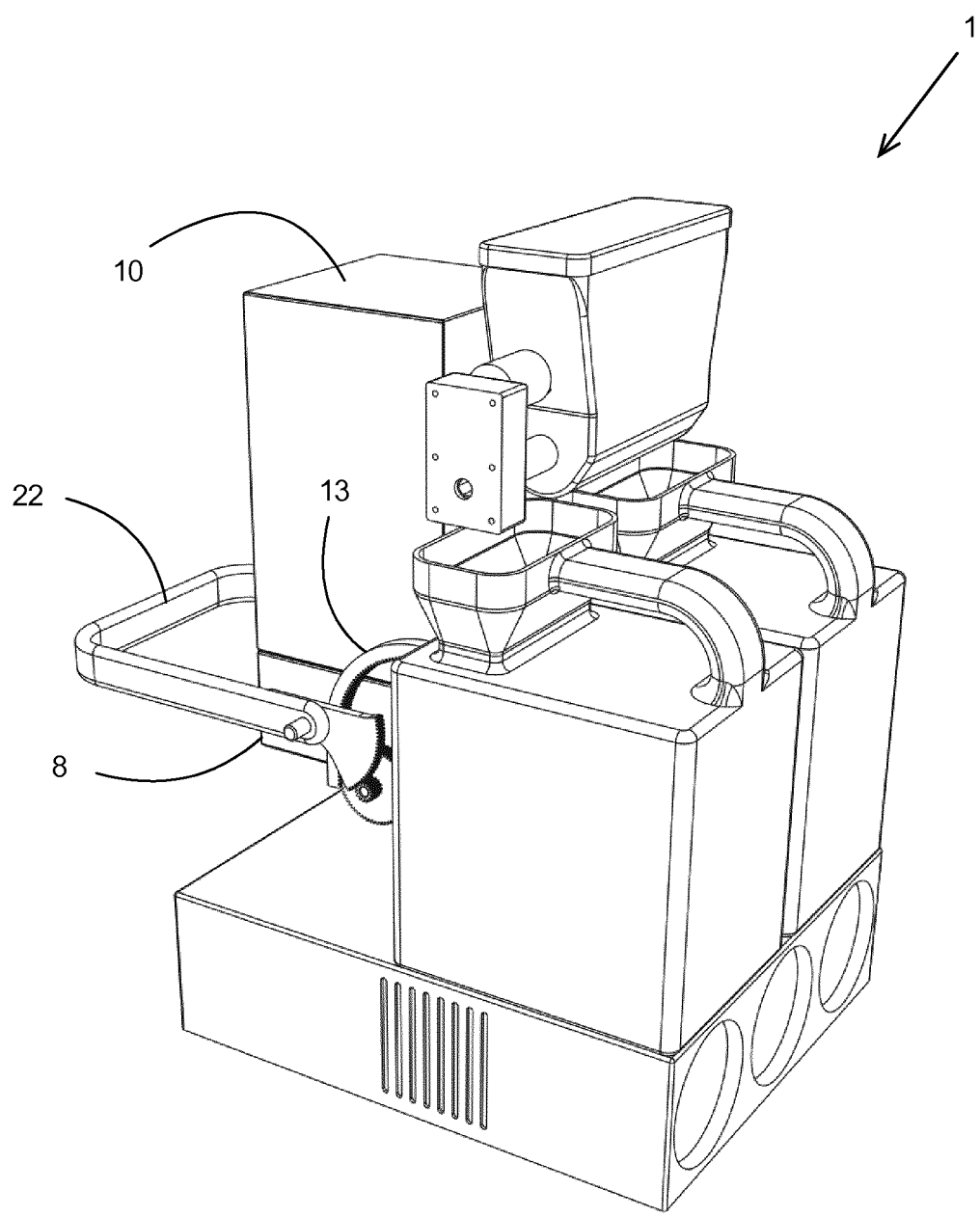
Figure 6C:
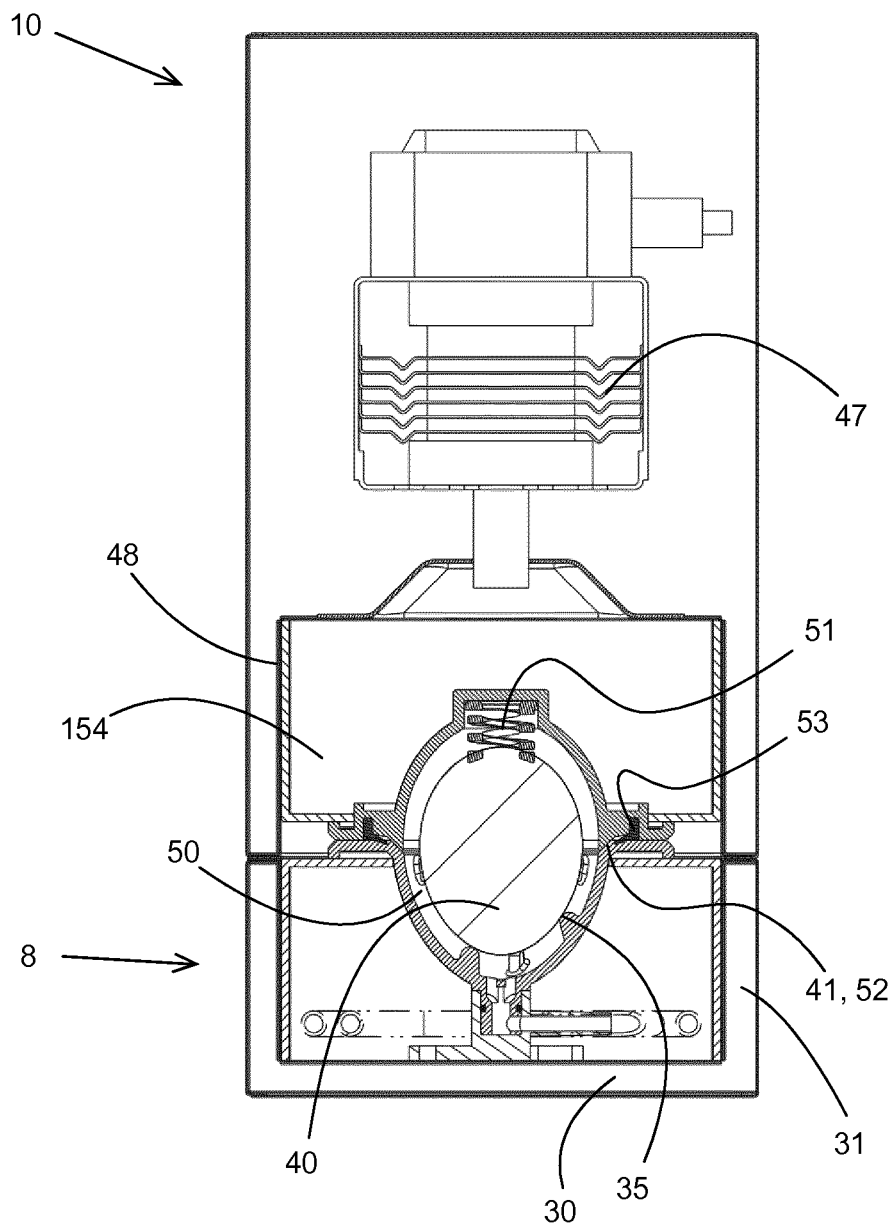
FIG. 6c shows a cross section of the apparatus as shown in FIGS. 6a-6b.
Figure 7:
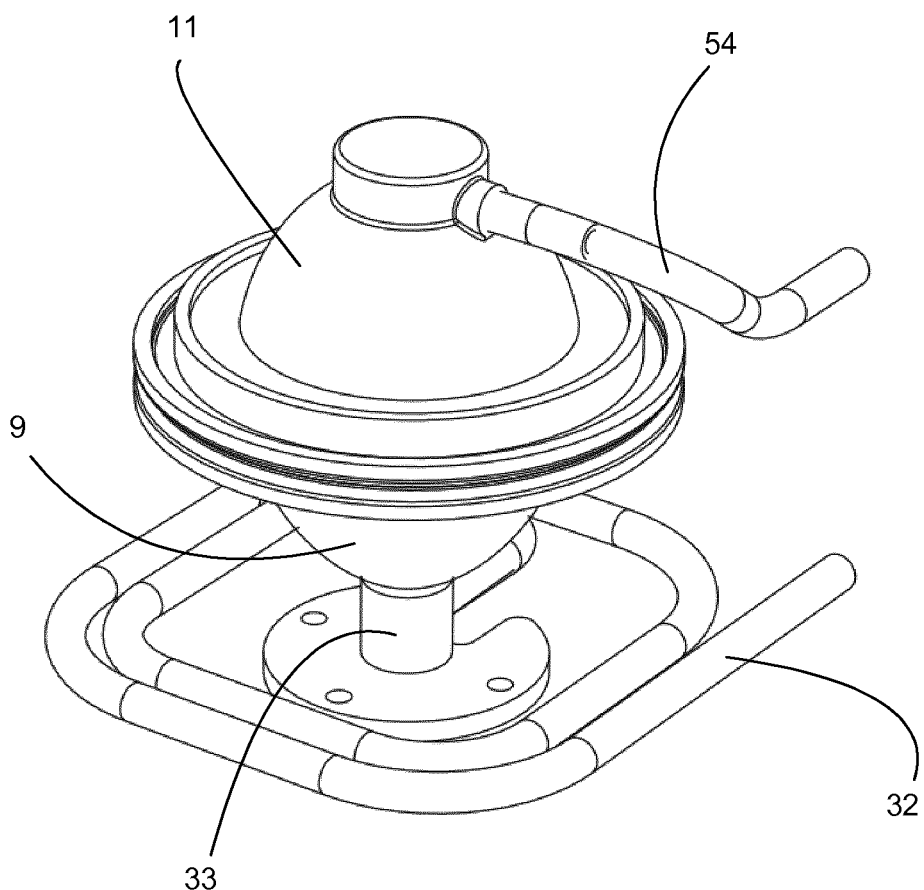
FIG. 7 shows a perspective view of a part of the apparatus as shown in FIGS. 6a-6c.

The apparatus 1 comprises a base 2 on which two containers 3 and 4 are located. Above the containers 3 and 4 a container 5 is located which container is provided with a dosing unit 6. The dosing unit 6 is located above an opening 7 of the container 3. The apparatus 1 further comprises a first housing part 8 with a first holder part 9 as well as a second housing part 10 with a second holder part 11. The second housing part 10 is connected in the apparatus 1 to the base 2 and has a fixed relation thereto. The first housing part 8 is movable with respect to the second housing part 10 between a first open position as shown in FIGS. 1a-1c and a second closed position as shown in FIGS. 6a-6c. The first housing part 8 is movable with respect to the second housing part 10 by means of manually operated gearing mechanisms 12 located on each side of the first and second housing part 8, 10. Each gearing mechanism 12 comprises a curved rod 13 which is provided with teeth 14 on a side directed to the base 2 and the containers 3, 4. The curved rods 13 are connected on two opposite sides of the first housing part 8. Each gearing mechanism 12 further comprises a first gear wheel 16 being pivotably about a pivot axis 17 and a second gear wheel 18 having a smaller diameter than the gear wheel 16, which second gear wheel 18 being connected to the gear wheel 16 and being rotatable simultaneously therewith about the pivot axis 17. The pivot axis 17 has a fixed position in the apparatus 1. The first gear wheel 16 cooperates with the teeth 14 of the rod 13. The second gear wheel 18 cooperates with teeth 19 on a disc 20, which disc 20 is pivotable about a pivot axis 21. The pivot axis 21 has a fixed position in the apparatus 1. The disc 20 is connected on a side remote of the teeth 19 to a U-shaped handle 22. The handle 22 comprises two legs 23 located on both sides of the second housing part 10 and connected to the discs 20, which legs 23 are interconnected on sides remote of the discs 20 by means of a bridge shaped part 24. By pivoting the handle 22 about the pivot axis 21 in a direction as indicated by arrow P1 the teeth 19 on the disc 20 will cooperate with the second gear 18 and will rotate the gear 18 in a clockwise direction as indicated by arrow P2. Since the second gear 18 is connected to the first gear 16, the first gear 16 will also be rotated in clockwise direction. As the teeth of the gear 16 cooperate with the teeth 14 on the rod 13, the rotation of the gear 16 will cause the rod 13 to move along the gear 16, whereby due to the curved shape of the rods 13 the first housing part 8 will firstly be moved in a mainly horizontal direction towards the containers 3, 4, after which the first housing part 8 will be moved simultaneously towards the containers 3, 4 as well as to the second housing part 10, whereby in the final stage of movement of the first housing part 8, the first housing part 8 will be moved vertically towards the second housing part 10 to the second closed position as shown in FIGS. 6a-6c. During the whole movement both housing parts 8, 10 remain horizontal. Especially the horizontal open position of the first housing part 8 being moved forwardly away form the containers 3, 4, facilitates the placement and removal of the eggs and easily prevents the egg from falling out of the first housing part.

As can be seen in FIGS. 1c, 3-5, 6c and 7 the first housing part 8 comprises a square bottom wall 30 and four side walls 31 extending perpendicularly to the bottom wall 30. On the bottom wall 30 a spirally conduit 32 is located which opens near the middle of the bottom wall 30 in a vertically extending tube 33. The end 34 of the conduit 32 is in connection with the container 3, 4 as will be explained with reference to the FIGS. 14 and 16. The first housing part 8 is further provided with the first holder part 9, which holder part 9 has a shape of half an egg and is provided with spacers 35 extending from the wall 36 of the first holder part 9. The first holder part 9 is provided at its lowest part with a tube 37, which fits into the tube 33 in the first housing part 8. The tube 37 is provided with a sealing ring 38 on the outside thereof to provide a watertight sealing between the tubes 33 and 37. The tube 37 is provided on a side near the wall 36 with a grid comprising a number of openings 39. In case that a egg 40 located in the first holder part 9 will break, the grid will prevent parts of the egg shell and the egg to enter the tubes 37, 33 and the conduit 32. As can be seen in FIG. 1c the spacers 35 keep the eggshell of the egg 40 at a predetermined distance from the wall 36 of the first housing part 9. The wall 36 of the first housing part 9 is provided with a conical part 41 at a side directed towards the second housing part 10.

The second housing part 10 is provided with a square top wall 45 and four side walls 46 extending downwardly therefrom. Inside the walls 45, 46 a device 47 for providing microwave radiation is located. Such an device is well known in the art and will not further be explained.

Below the device 47 a square chamber 48 is located in which the second holder part 11 is mounted. The second holder part 11 is provided with an inner wall 49 having a shape of half an egg. The wall 49 of the second holder part II together with the wall 36 of the first holder part 9 define a cavity 50 having an egg shaped form wherein a first longitudinal end being relatively narrow is located near the bottom of the first holder part 9 whilst a second longitudinal end being relatively wide is located near a top of the wall 49.

Near the top of the wall 49 a spring 51 is provided, which spring 51 rests against the second end of the egg 40 when the housing parts 8, 10 are in their first closed position (see FIGS. 6, 7), thereby pressing the egg 40 on the spacers 35 to maintain a fixed position of the egg 40 in the cavity 50.

The second holder part 11 is provided with a conical part 52, which cooperates with the conical part 41 of the first housing part 9 to facilitate the correct positioning of the first housing part 8 with respect to the second housing part 10. The second holder part 11 is further provided with a ring shaped seal 53 which rests against the first holder part 9 in the closed position, as shown in FIG. 6c and provides a water tight seal between the first holder part 9 and the second holder part 11. The second holder part 11 is connected near the top thereof to a conduit 54, which conduit 54 is in fluid communication with the container 4, as will be further explained with reference to the FIGS. 14 and 16. In the closed position as show in the FIGS. 6a-6c, microwave radiation can be generated by the device 47 in the confined space 154, which space 154 is bounded by the chamber 48 of the second housing part 10 and the walls 30, 31 of the first housing part 8. The first holder part 9 and the second holder part 11 are made from materials being transparent to microwave radiation so that microwave radiation will also reach the cavity 50 in which an egg 40 is being positioned. Such materials are well known in the art, for example as described in the above mentioned initial patent application WO2012002814A1. Before explaining the operation of the apparatus 1, other embodiments of apparatuses according to the invention will be described since the working principles of these apparatuses are mainly the same.

Figure 8A:
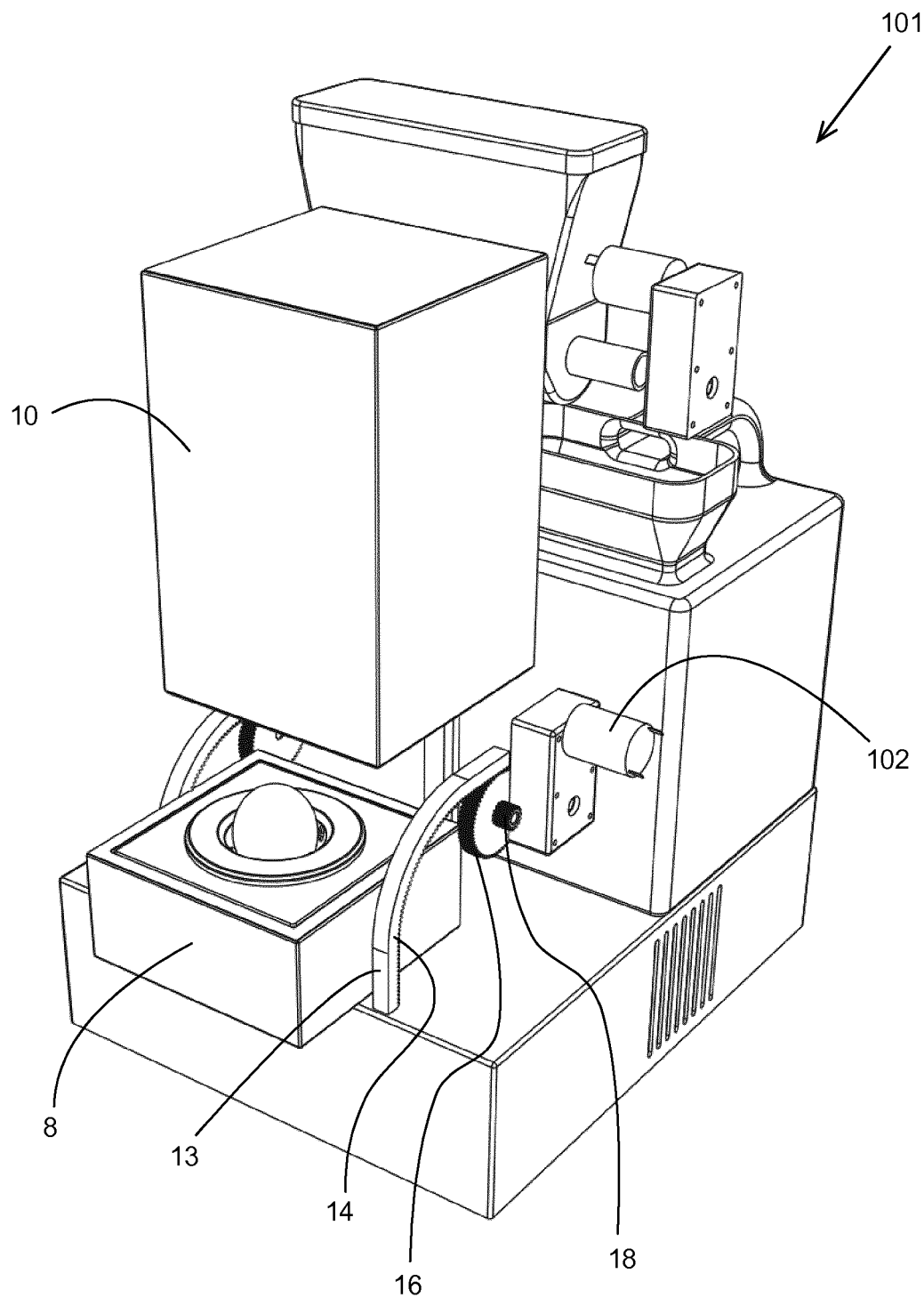
FIGS. 8a and 8b show a front and rear perspective view of a second embodiment of the apparatus according to the invention in an open position of the housing parts.
Figure 8B:
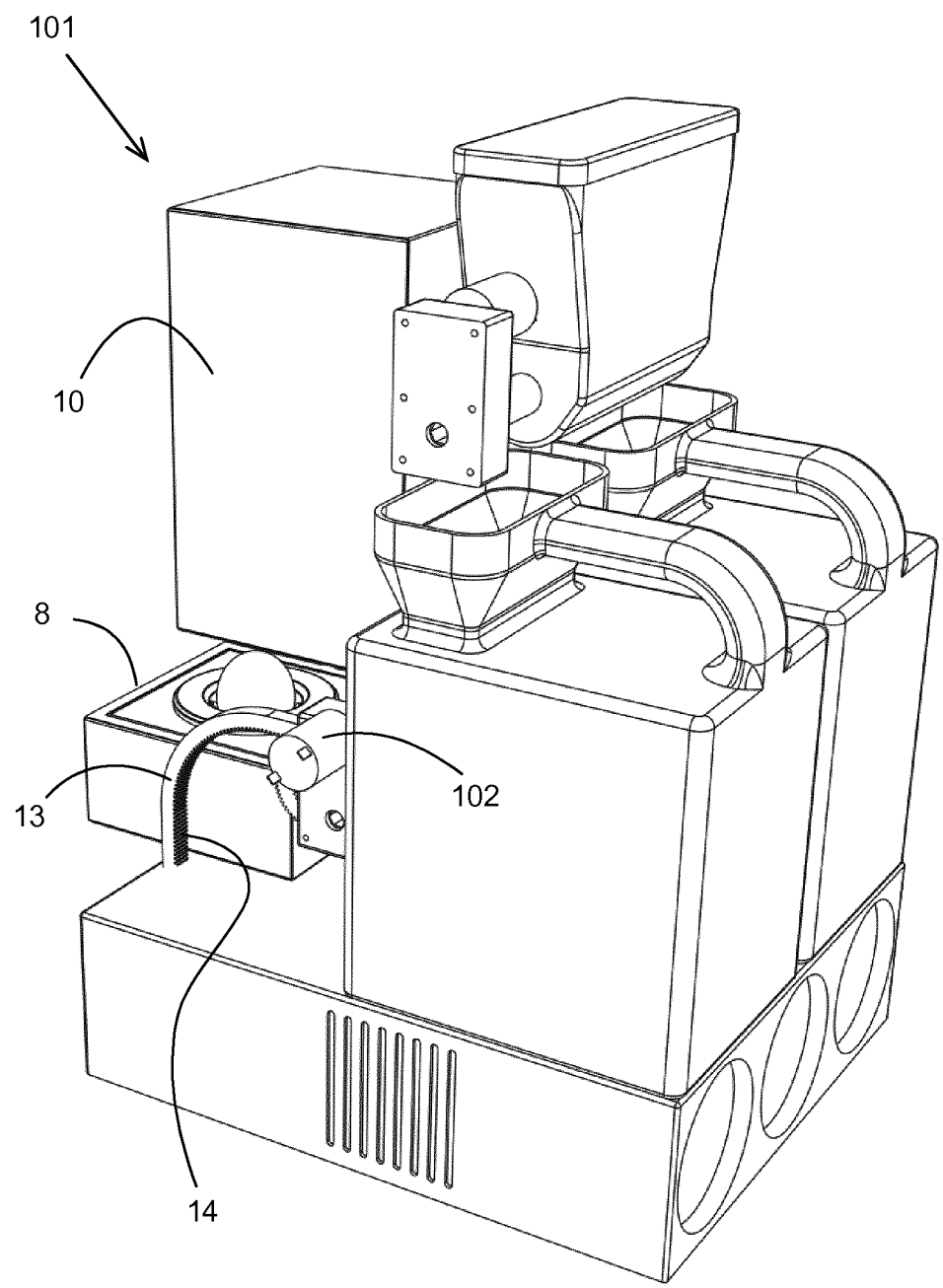
Figure 9:
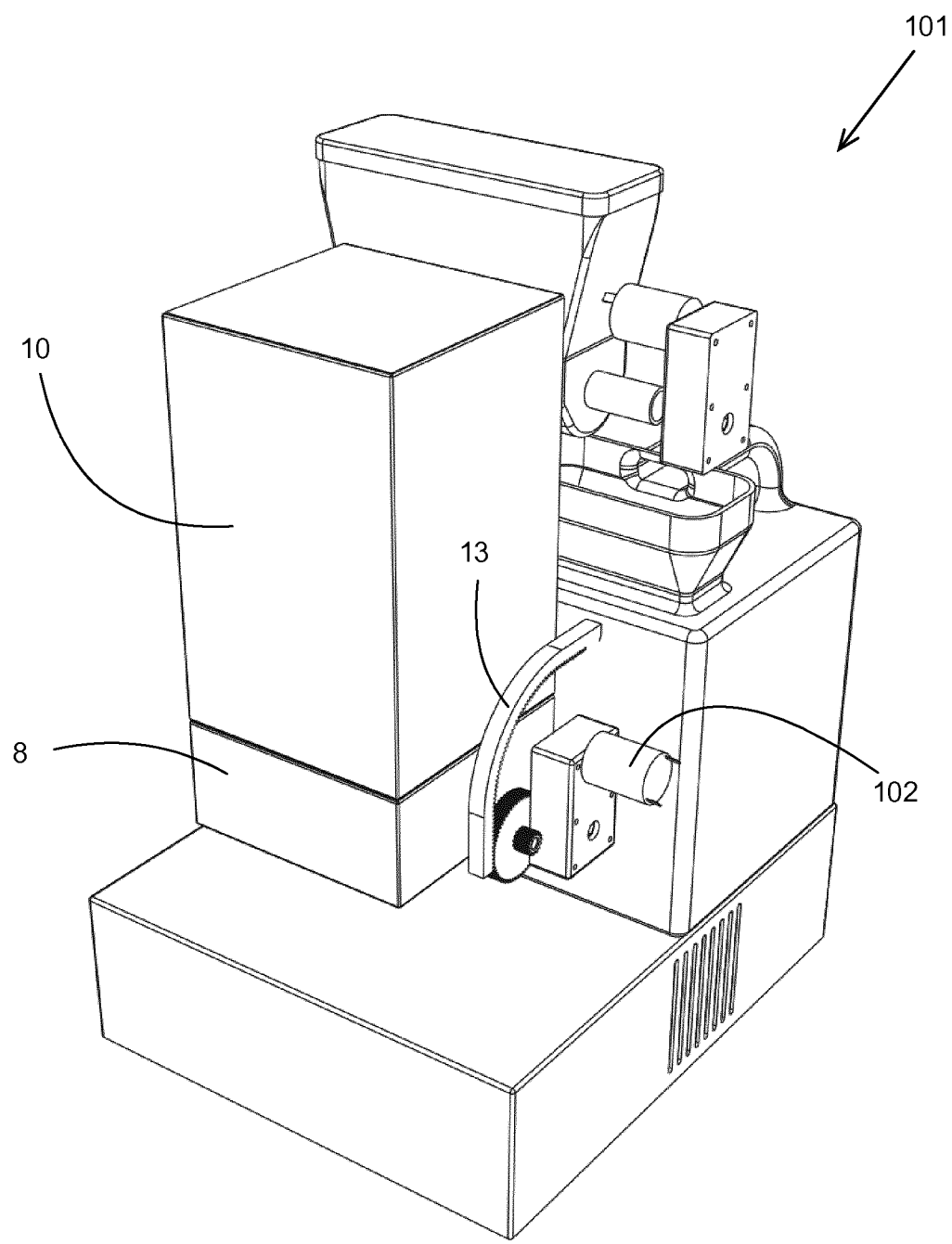
FIG. 9 shows a perspective front view and rear view of the apparatus as shown in FIG. 8a-8b in a closed position of the housing parts.

FIG. 8a-9 disclose a second embodiment of an apparatus 101 according to the invention which apparatus 101 differs from the apparatus 1 in that the gear 18 is driven by an electric motor 102 instead of by pivoting the handle 24 manually.

Figure 10A:
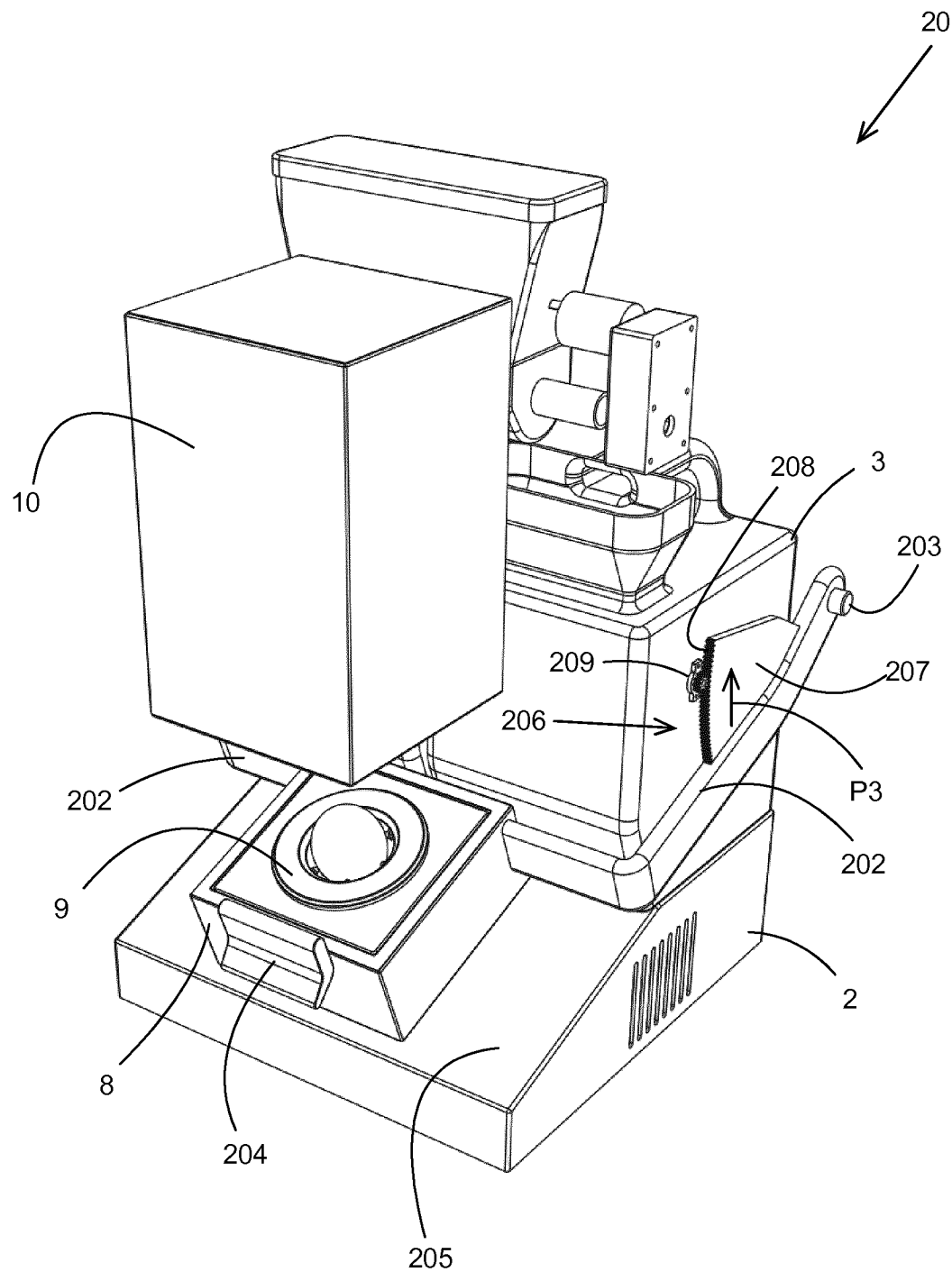
FIG. 10a and 10b show a front and rear perspective view of a third embodiment of the apparatus according to the invention in an open position of the housing parts.
Figure 10B:
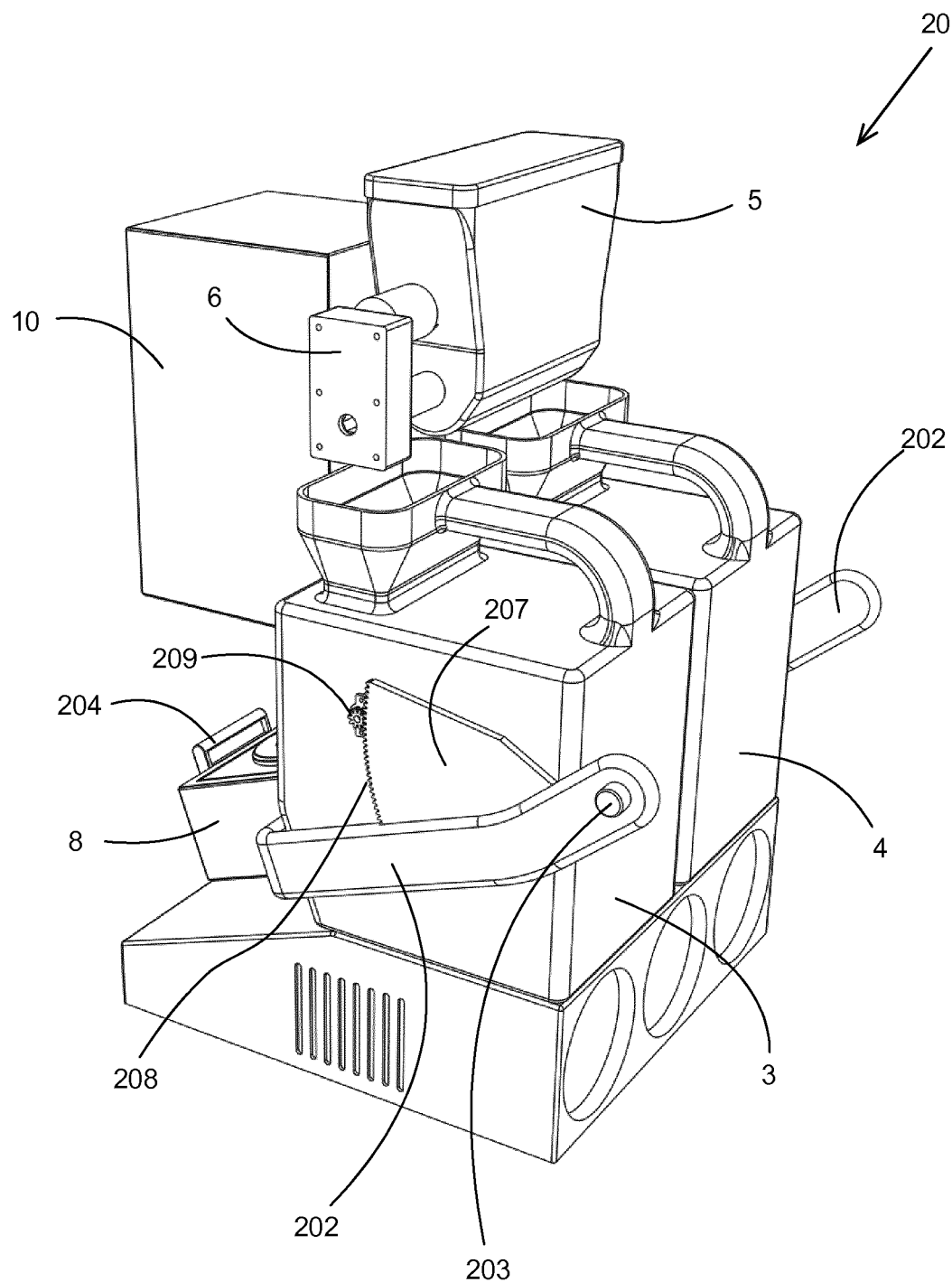
Figure 11:
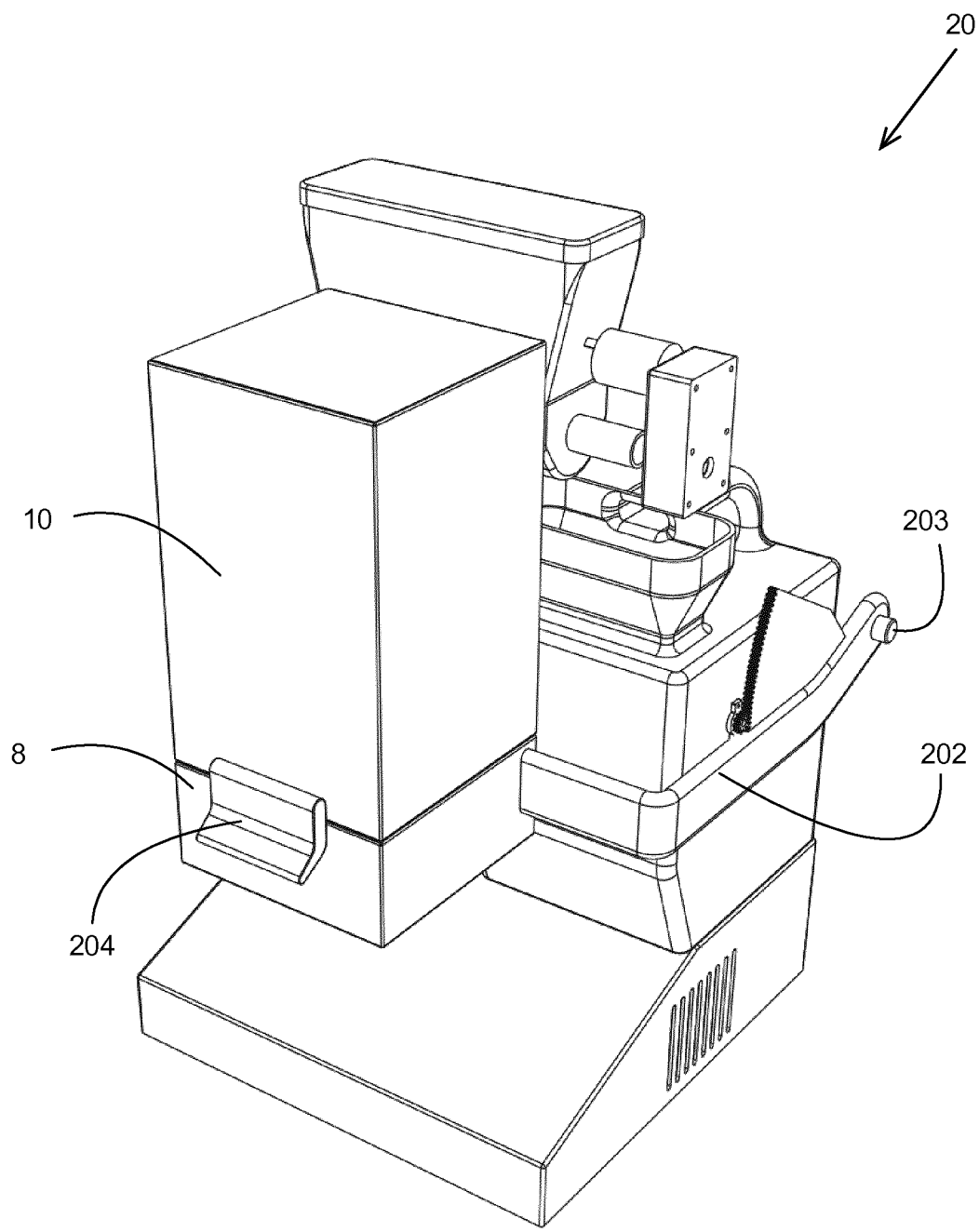
FIG. 11 shows a perspective front view and rear view of the apparatus as shown in FIGS. 10a and 10b in a closed position of the housing parts.

The FIGS. 10a-11 disclose a third embodiment of an apparatus 201 according to the invention which differs from the apparatus 1, 101 in that the first housing part 8 is only pivotable with respect to the second housing part 10. The first housing part 8 is provided at a side near the containers 3, 4 with two L-shaped brackets 202, which L-shaped brackets 202 are pivotable with respect to the base 2 about pivot axis 203. The pivot axis 203 has a fixed position in the apparatus 201. At a side remote of the containers 3, 4 the first housing part 8 is provided with a handle 204. By means by the handle 204 a user can manually move the first housing part 8 from the open position as shown in FIGS. 10a-10b to the closed position as shown in figure ii and vice versa. In the handle 204 a locking mechanism is provided to lock the handle 204 to the second housing part 10 in the closed position of the housing parts 8, 10. Well known locking mechanisms can be used for such a lock. The base 2 of the apparatus 201 is provided with a slanted surface 205 on which the first housing part 8 rests in the open position thereof.

To provide a smooth movement of the first housing part 8 from the closed position to the open position and to prevent that the first housing part 8 simply drops on the slanted surface 205, the apparatus 201 is provided with a damping mechanism 206.

The damping mechanism 206 comprises on each L-shaped bracket 202 a disc 207 being provided with teeth 208. The teeth 208 cooperate with a gear wheel 200, which is rotatable about an axis which has a fixed position in the apparatus 201. The gearwheel 200 is prevented against relatively fast rotation so that only by moving the teeth 208 relatively slowly in or opposite a direction as indicated by arrow P3 the first housing part 8 can be moved with respect to the second housing part 10.

Figure 12A:
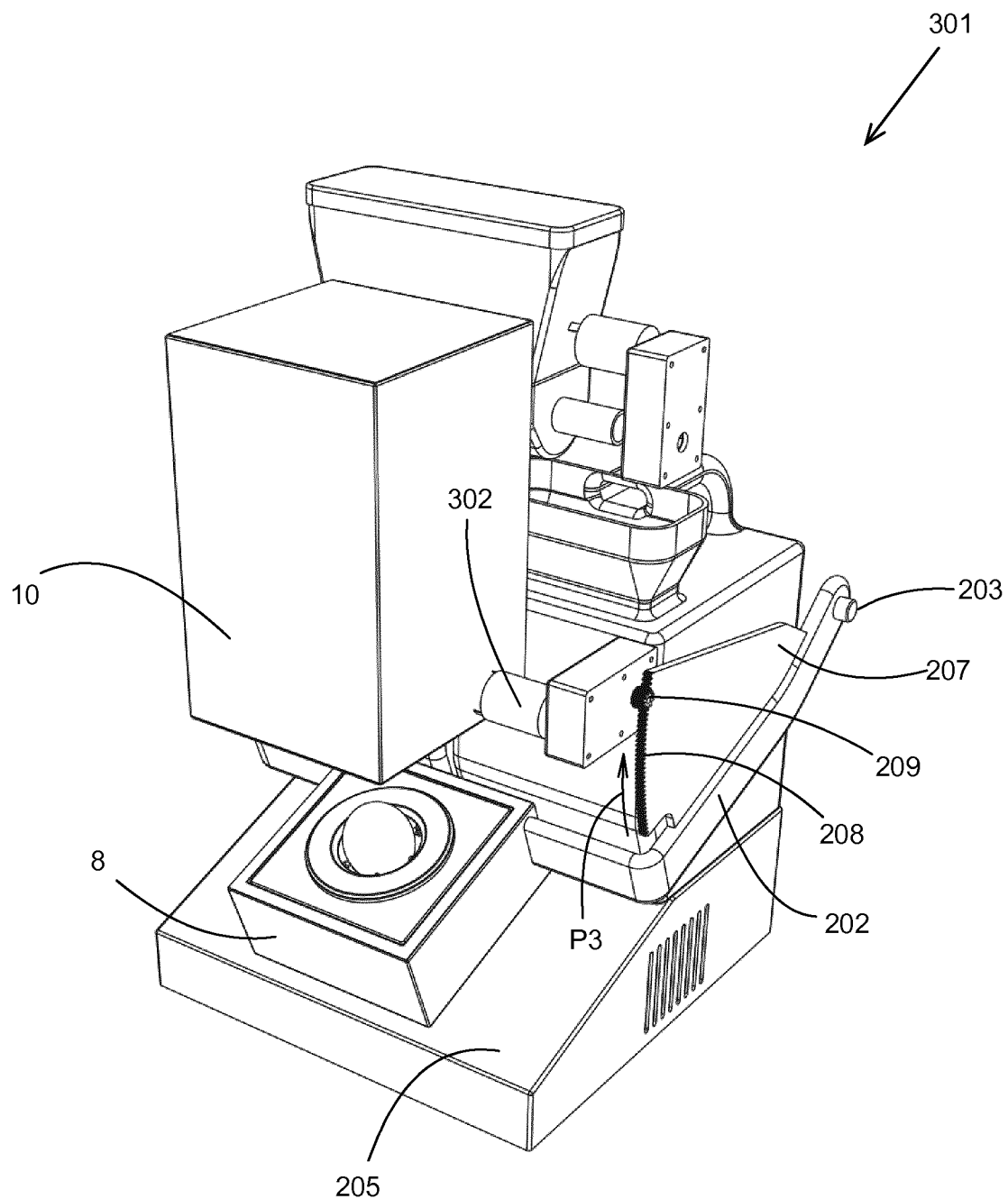
FIGS. 12a and 12b show a front and rear perspective view of a fourth embodiment of the apparatus according to the invention in an open position of the housing part.
Figure 12B:
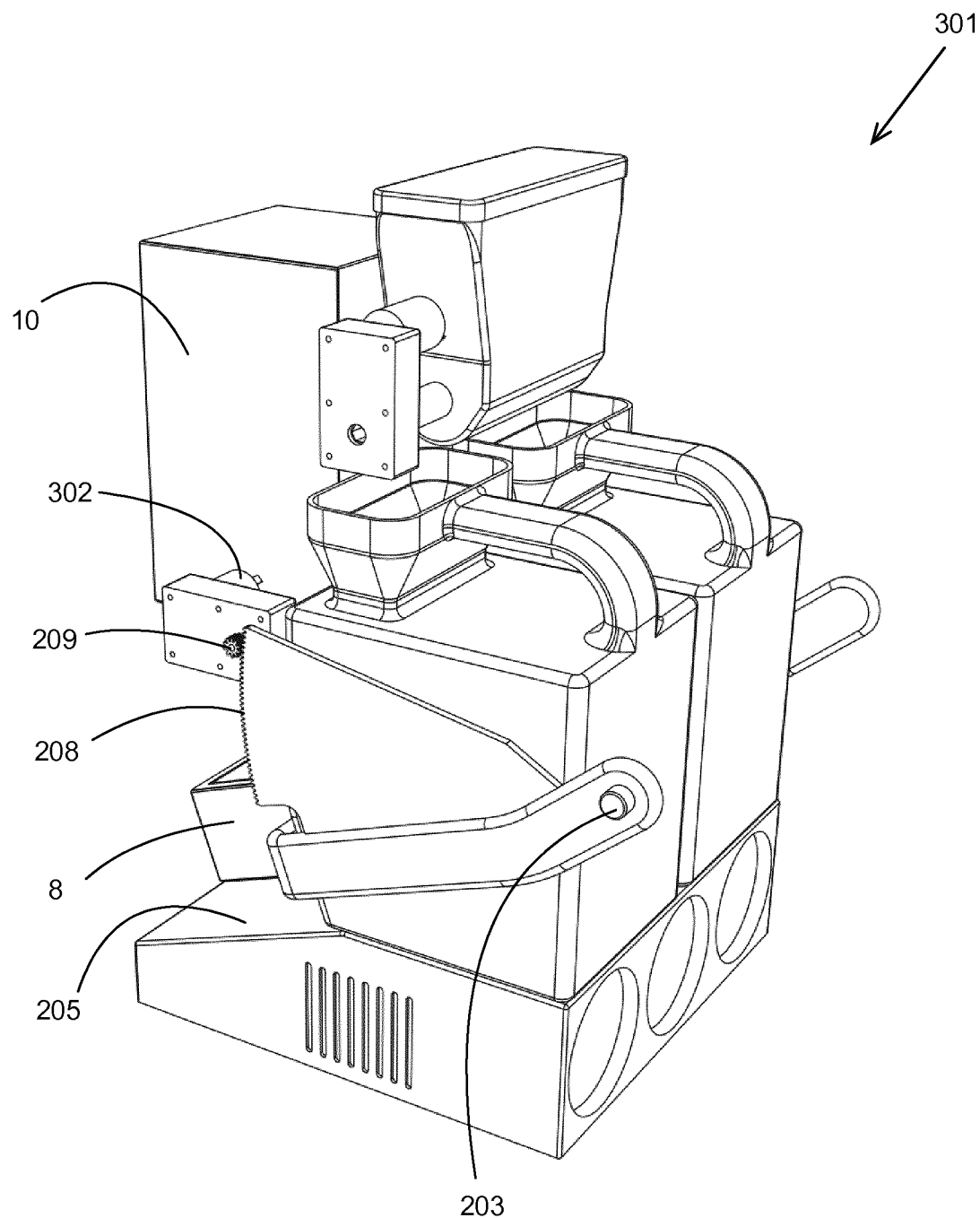
Figure 13:
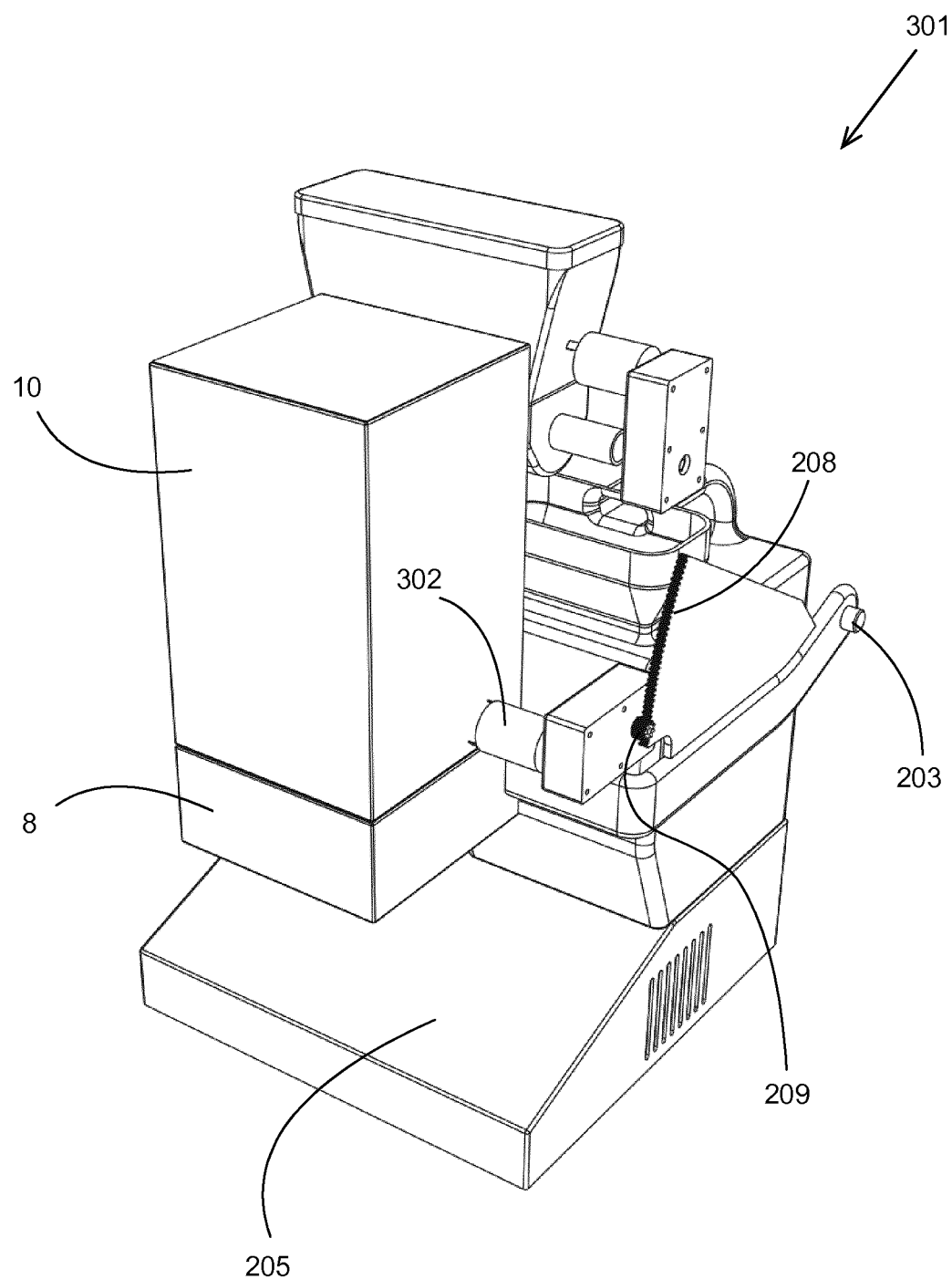
FIG. 13 shows a perspective front view and rear view of the apparatus as shown in FIGS. 12a and 12b in a closed position of the housing parts.

FIGS. 12*a*-13 disclose a fourth embodiment of an apparatus 301 according to the invention which differs from the apparatus 201 in that the gear wheel 200 is now electrically driven by a motor 302 which motor has a fixed position in the apparatus 301. By operating the electric motor 302, the gear wheel 200 is being driven. Since the gearwheel 200 cooperates with the teeth 208 on the disc 207, the disc 207 as well as the L-shaped bracket 202 and the first housing part 8 will be moved in a direction as indicated by arrow P3 to move the first housing part 8 from the open position as shown in FIG. 12*a*-12*b* to the closed position as shown in FIG. 13. By rotating the gearwheel 209 in the opposite direction the first housing part 8 will be moved in a direction opposite to arrow P3 from the closed position to the open position.

Figure 14:
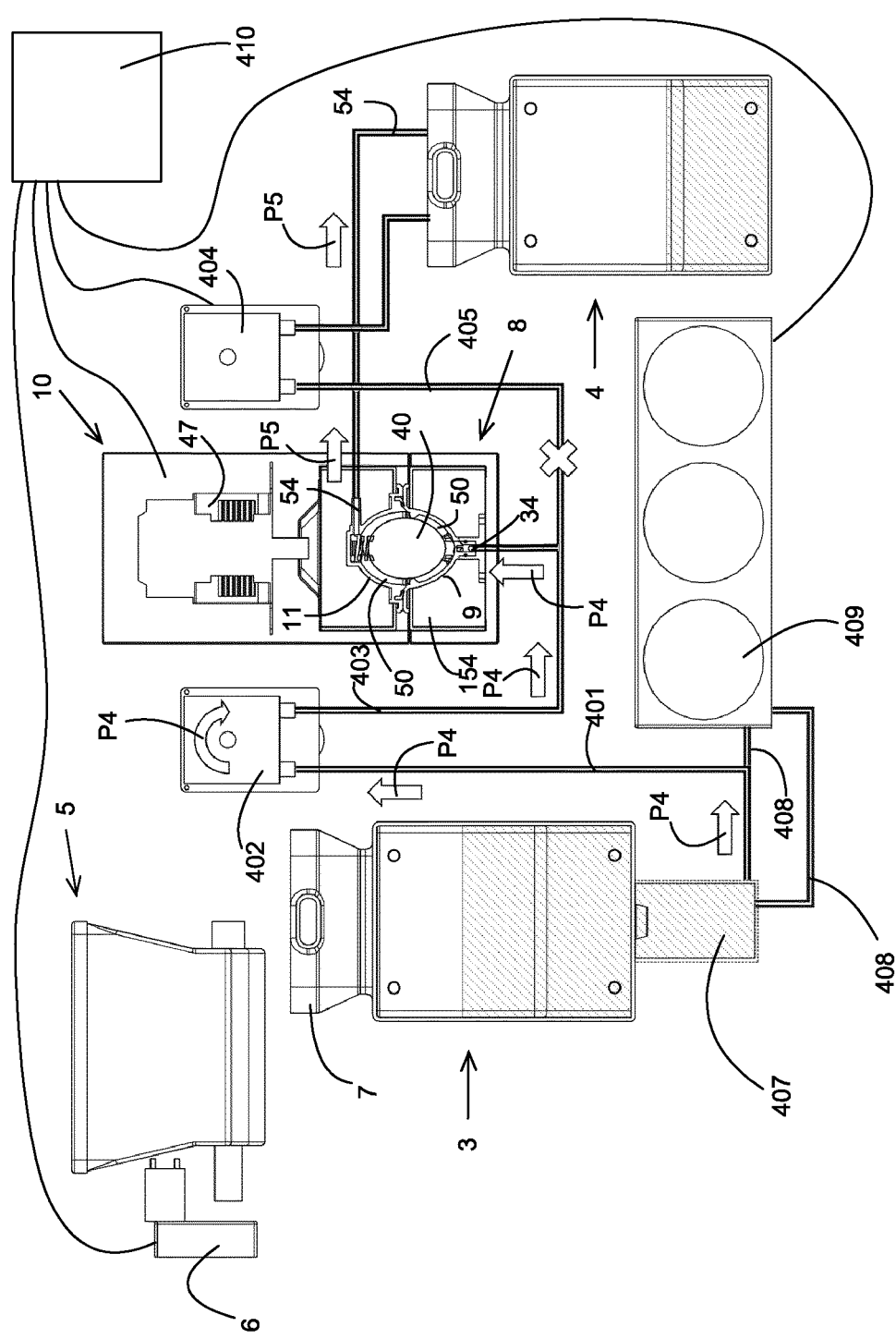
FIG. 14 shows a working scheme of the apparatus as shown in the FIGS. 6a-6b, 9, 11, 13 during the filling of the cavity and the cooking of the egg.
Figure 16:
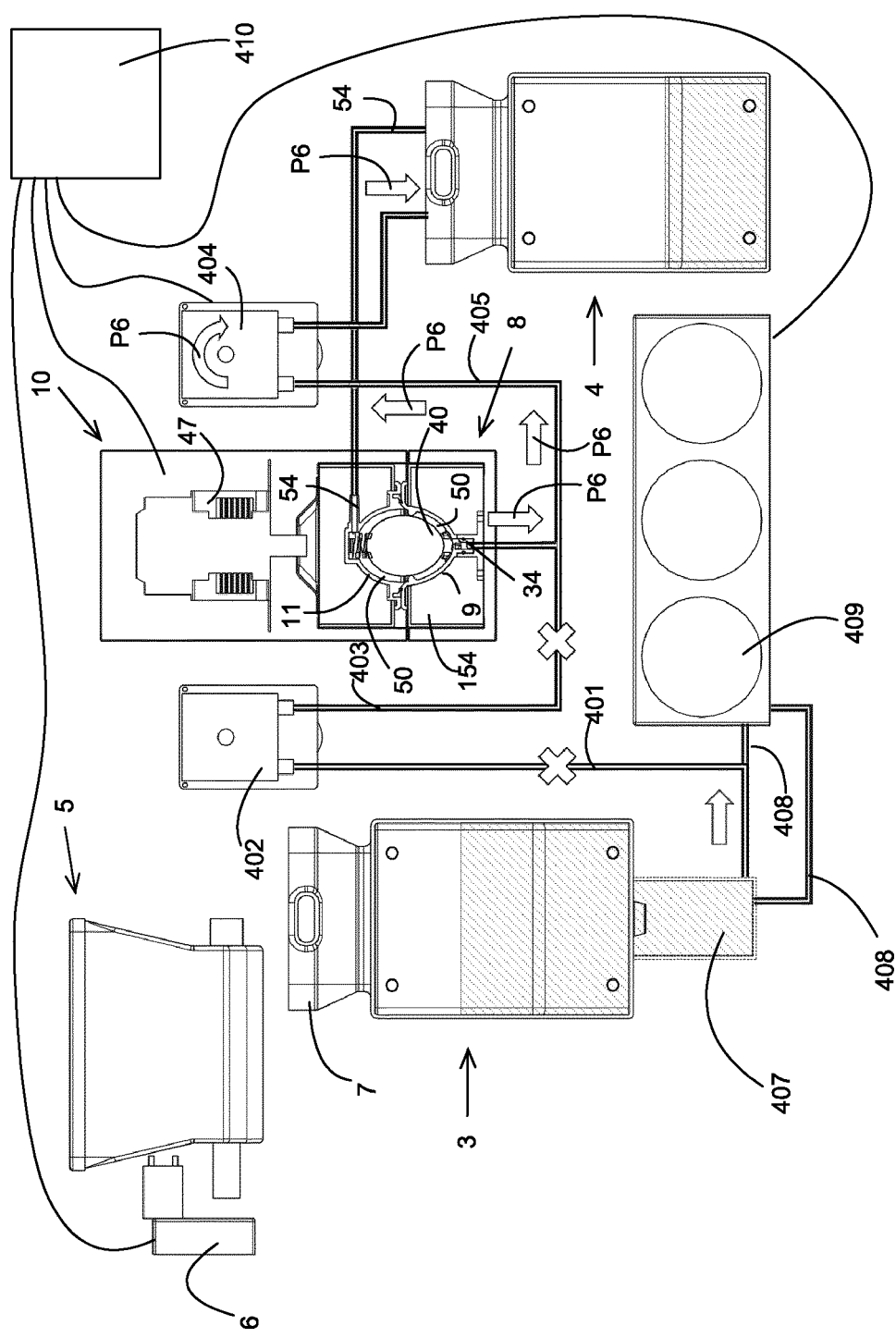
FIG. 16 shows a working scheme of the apparatuses as shown in the FIGS. 6a-6b, 9, 11, 13 during empting of the cavity after cooking of the egg.

FIGS. 14 and 16 show a more schematic view of the apparatus 1, 101, 201, 301.

As can be seen the first container 3 is connected via a conduit 401 to a first peristaltic pump 402. An outlet of the peristaltic pump 402 is connected via a conduit 403 to the end 34 of the spirally conduit 32 in the first housing part 8. The apparatus 1, 101, 201, 301 is further provided with a second peristaltic pump 404, which is connected by means of a conduit 405 to the end 34 of the spirally conduit 32 and is connected on another side of the pump 404 by means of a conduit 406 to the container 4. The conduit 54, which is connected to the cavity 50 in the second holder part 11 opens at an end remote of the cavity 50 into the container 4. Both the containers 3, 4 are open at the top so that in the containers a 3, 4 the atmospheric pressure exists.

The first container 3 is provided at its lower part with a buffer unit 407. The buffer unit 407 is connected by means of a conduit 408 to a heat exchanger, for example a Peltier heat exchanger 409 to preheat the liquid before it enters first housing part 8. In the buffer 407 a temperature sensor may be present to check whether the liquid has the desired temperature.

The peristaltic pumps 402, 404, the device 47 for providing microwave radiation in the space 154, the Peltier heat exchanger, the dose unit 6 as well as sensors to check for example the liquid level in the containers 3, 4 are all controlled by means of a computer 410.

FIG. 14 discloses a scheme of the filling of the cavity 50 as well as the process during the cooking process of the egg 40.

The operations of the apparatus 1, 101, 201, 301 are as follows.

After placing an egg 40 in the cavity 50 and closing the first housing part 8 and the second housing part 10 the liquid in the buffer unit 407 will be heated to a predetermined temperature of for example 20 degrees Celsius.

After the liquid has reached the desired temperature the liquid will be pumped by means of the first pump 402 through the conduit 401 and the conduit 403 in the direction as shown by the arrow P4 into the spirally conduit 32 and into the cavity 50. The egg 40 will be nearly completely surrounded by the liquid except for the locations where the egg is in contact with the spacers 35 and the spring 51. It is also possible that a small part of the egg 40 near the spring 51 is not completely covered with the liquid. The liquid can be water with an addition of NaCl, for example preferably 0.2M NaCl (about 12 gram/litre water), to obtain a liquid with a dielectric constant with an imaginary part, ε", between 20-500 at a temperature between 0° C.-100° C. and at a microwave frequency of 2.45 GHz.

With an egg of about 60-65 grams and a length of about 56-60 millimetres an amount of about 45 millilitre of liquid will be sufficient to fill the space between the eggshell of the egg 40 and the walls 36, 49 of the first holder part 9 and the second holder part 11, whereby a layer of liquid around the eggshell is obtained having an average thickness of 2-8 millimetres.

After the cavity 50 is initially filled with the desired amount the device 47 operating at a common 2.45 GHz is switched on at a constant power of for example 1000 Watt, whereby microwave radiation is generated in the space 154 to heat the liquid as well as the egg 40 in the cavity 50. As soon the liquid starts to boil, the generated steam can escape through the conduit 54 and will flow in the direction indicated by arrow P5 into the container 4. To prevent that due to the evaporation of the liquid the egg 40 will no longer be surrounded with liquid, additional liquid is added to the cavity 50. This liquid enters the first housing part 8 at a temperature of about 20 degrees in small pulses by activating the first pump 402 during a predetermined time. Since the conduit 32 is located inside the cavity 54, also the liquid present in the conduit 32 will be heated by the microwave radiation. The conduit 32 might have a length of for example 40-80 centimetres being long enough to heat up the liquid in the conduit 32 at the end 34 from 20° C. so that the liquid when entering the cavity 50 will have about the same temperature as the liquid already present in the cavity 50. Other lengths are also possible.

Figure 15:
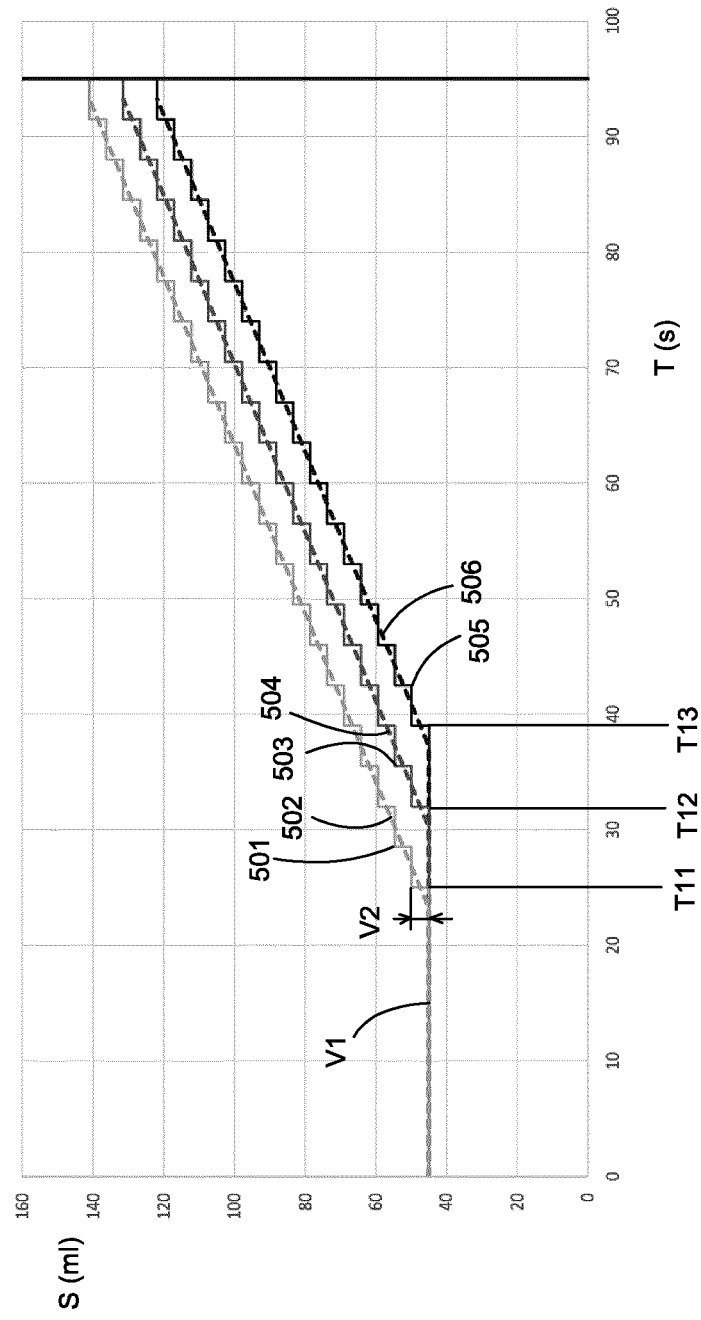
FIG. 15 shows a diagram disclosing the microwave radiation time versus the amount of liquid added to the cavity.

As can be seen in FIG. 15 a first amount V1 of liquid is added before the microwave radiation starts. After a period of time T11 of for example 25 seconds a small amount V2 of for example 5 millilitres is added to the cavity 50 which amount V2 is then added every 3.5 seconds. In the diagram, the pulses are shown by a line 501. In the diagram also the average amount of liquid added to the cavity 50 is indicated by means of a line 502. During the cooking process by means of the microwave radiation, the power of the device 47 is kept constant at 1000 Watt. By operating the device at a constant power no irregular change in the microwave radiation will occur. After 95 seconds the microwave radiation will be stopped as can be seen in the diagram. As shown in FIG. 15 almost 100 millilitres have been added to the cavity 50 after the initial first amount of 45 millilitres. By adding such a relatively large second amount of liquid starting after such a relatively short time T11, a soft-boiled egg will be obtained.

By starting the insertion of additional liquid in the cavity 50 after a longer period of time T12, for example after 32 seconds of the start of the microwave radiation and by adding the same amount V2 in the same intervals of 3.5 seconds a middle-boiled egg will be obtained. The lines 503, 504 show respectively the pulses and the average amount of added liquid. The total second amount of liquid added to the cavity 50 for a middle-boiled egg is less than for a soft-boiled egg.

If the insertion of additional liquid starts even later, for example after a longer period of time T13, for example after 39 seconds with the same amount V2 and the same interval, a hard-boiled egg will be obtained. The lines 505, 506 show respectively the pulses and the average amount of added liquid. The total second amount of liquid added to the cavity 50 for a hard-boiled egg is less than for a soft-boiled egg and a middle-boiled egg.

After the microwave radiation has been switched off, the second pump 404 is switched on to pump 405 the liquid in the cavity 50 in a direction as indicated by arrow P6 through the conduit 32 into the conduit 404, through the pump 405 into the conduit 406 into the container 4 for waste liquid. The conduit 32 as well as the tubes 33, 37 are used both as inlet for the liquid into the cavity 50 as well as an outlet of the liquid from the cavity 50.

It is also possible to use microwave radiation whereby the power thereof is changed, for example lowered during the cooking process. In such a case the amount of liquid added during the microwave radiation will be different from the amount as shown in FIG. 15. It is also possible that instead of adding the liquid in pulses with an amount of V2 to add the liquid in smaller or larger amounts with a interval being larger or smaller than described above.

It is also possible to add the liquid at a constant rate or to vary the amount of added liquid in time. Also, smaller step sizes can be chosen, such that the flow is accurately controlled by means of pulse width modulation, resulting in the same egg preparation program with the same amounts of pumped liquids.

It is also possible to have different holders for different sizes of eggs.

It is also possible to have other amounts of NaCl in the water, for example between 10 and 14 gram/litre water.

It is also possible to preheat the liquid to another temperature, for example about 30-35 degrees Celsius before entering the housing.

It is also possible to start the addition of the second amount of liquid based on for example the temperature in the cavity or the amount of liquid that has been evaporated and has left the cavity.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the scope should not be construed as limiting the scope of the claims.

LIST OF REFERENCE SIGNS 1 apparatus
2 base
3 container
4 container
5 container
6 dosing unit
7 opening
8 first housing part
9 first holder part
10 second housing part
11 second holder part
12 gearing mechanism
13 rod
14 teeth
16 gear wheel
17 pivot axis
18 gear wheel
19 teeth
20 disc
21 pivot axis
22 handle
23 leg
24 bridge shaped part
30 bottom wall
31 side wall
32 conduit
33 tube
34 end
35 spacer
36 wall
37 tube
38 sealing ring
39 opening
40 egg
41 conical part
45 top wall
46 side wall
47 device
48 chamber
49 wall
50 cavity
51 spring
52 conical part
53 seal
54 conduit
101 apparatus
154 space
201 apparatus
202 bracket
203 pivot axis
204 handle
205 surface
206 damping mechanism
207 disc
208 teeth
209 gear wheel
301 apparatus
302 motor
401 conduit
402 peristaltic pump
403 conduit
404 peristaltic pump
405 conduit
406 conduit
407 buffer
409 heat exchanger
410 computer
501 line
502 line
503 line
504 line
505 line
506 line
P3 arrow
P4 arrow
P6 arrow
V1 amount of liquid
V2 amount of liquid
T11 period of time
T12 period of time
T13 period of time

The invention claimed is:

1. An apparatus for cooking at least one egg with an eggshell, which apparatus comprises a housing provided with a device for providing microwave radiation in a confined space in the housing and a holder located in the confined space, which holder being provided with at least one cavity adapted to the shape of the egg with the eggshell, the cavity configured to receive the egg with the eggshell, wherein a long axis of the egg with the eggshell is in a vertical orientation, which holder comprises at least a first holder part comprising spacers for keeping the egg with the eggshell at a predetermined distance from a wall of the first holder part, and a second holder part comprising an open outlet for at least a gaseous phase of the liquid formed in the cavity during a cooking process, the first and second holder parts being movable with respect to each other between a first position in which the first and second holder parts are separated from one another and the egg with the eggshell can be positioned in the cavity to a second position wherein the holder parts enclose the cavity and the egg with the eggshell contacts the spacers of the first holder part, which apparatus further comprises means to insert a liquid into the holder for filling the cavity with the liquid to at least partly surround the eggshell of the egg located in the cavity, wherein the means to insert a liquid into the holder comprises at least a liquid inlet and a liquid outlet, with the liquid outlet being located in the first holder part at a point lower than the egg with the eggshell, wherein the housing comprises at least a first housing part provided with the first holder part and a second housing part provided with the second holder part, which first housing part is located at least partly below the second housing part, wherein the first housing part with the first holder part is movable between the first and second position with respect to the second housing part with the second holder part.

2. An apparatus according to claim 1, wherein the first holder part is provided with spacers for keeping the egg at a predetermined distance from a wall of the first holder part, whilst the second holder part is provided with a spring for pressing the egg against the spacers of the first holder part.

3. An apparatus according to claim 1, wherein a seal is provided between the first holder part and the second holder part.

4. An apparatus according to claim 1, wherein the first and/or second holder part are removably located in respectively the first housing part and the second housing part.

5. An apparatus according to claim 1, wherein the first housing part is being movable away from the second housing part from the second position to the first position in at least a downward direction.

6. An apparatus according to claim 1, wherein the first housing part is being pivotable with respect to the second housing part from the second position to the first position in at least a downward direction.

7. An apparatus according to claim 1, wherein the apparatus comprises a container for holding aqueous liquid and a dosing unit to add at least one component to the aqueous liquid to provide the aqueous liquid with a dielectric constant with an imaginary part, $\varepsilon''$, between 20-500 at a temperature between 0° C.-100° C. and at a microwave frequency of 2.45 GHz.

8. An apparatus according to claim 7, wherein the aqueous liquid is water with NaCl.

9. An apparatus according to claim 8, wherein the NaCl is present at a concentration of 0.2 M NaCl.

10. An apparatus according to claim 1, wherein the apparatus comprises a container for waste liquid, which container is connected to the cavity.

11. An apparatus according to claim 1, wherein the apparatus comprises a lock to maintain the first holder part and the second holder part in the second position at least during providing microwave radiation in the confined space.

12. An apparatus according to claim 1, wherein the cavity is chicken-egg-shaped, with a relatively small end of the chicken-egg-shape directed towards the first holder part and a relatively wider end of the chicken-egg-shape directed towards the second holder part.

13. An apparatus according to claim 1, wherein the liquid has an average layer thickness between the holder and the eggshell of the egg between 2 and 8 millimetres.

14. A method for cooking at least one egg with an eggshell, the method comprising:

applying microwave radiation to at least one cavity containing the at least one egg with an eggshell, wherein the at least one egg with an eggshell is located in an apparatus comprising:

a housing provided with a device for providing microwave radiation in a confined space in the housing; and a holder located in the confined space, which holder being provided with the at least one cavity adapted to the shape of the egg with the eggshell, the cavity configured to receive the egg with the eggshell, wherein a long axis of the egg with the eggshell is in a vertical orientation, which holder comprises:

at least a first holder part comprising spacers for keeping the egg with the eggshell at a predetermined distance from a wall of the first holder part; and a second holder part comprising an open outlet for at least a gaseous phase of the liquid formed in the cavity during a cooking process, the first and second holder parts being movable with respect to each other between a first position in which the first and second holder parts are separated from one another and the egg with the eggshell can be positioned in the at least one cavity to a second position wherein the first and second holder parts enclose the at least one cavity and the egg with the eggshell contacts the spacers of the first holder part, which apparatus further comprises:

means to insert a liquid into the holder for filling the at least one cavity with the liquid to at least partly surround the eggshell of the egg located in the at least one cavity, wherein the means to insert a liquid into the holder comprises at least a liquid inlet and a liquid outlet located, with the liquid outlet being located in the first holder part at a point lower than the egg with the eggshell, wherein the housing comprises:

at least a first housing part provided with the first holder part; and a second housing part provided with the second holder part, which first housing part is located at least partly below the second housing part, wherein the first housing part with the first holder part is being moved between the first and second position with respect to the second housing part with the second holder part.

* * * * *